(12) United States Patent
Kaneko et al.

(10) Patent No.: US 6,332,139 B1
(45) Date of Patent: Dec. 18, 2001

(54) INFORMATION COMMUNICATION SYSTEM

(75) Inventors: Toshikazu Kaneko; Masakazu Nishimoto, both of Osaka (JP)

(73) Assignee: Mega Chips Corporation, Osaka (JP)

( * ) Notice: Subject to any disclaimer, the term of this patent is extended or adjusted under 35 U.S.C. 154(b) by 0 days.

(21) Appl. No.: 09/435,916

(22) Filed: Nov. 8, 1999

(30) Foreign Application Priority Data

| Nov. 9, 1998 | (JP) | 10-317704 |
| Jun. 30, 1999 | (JP) | 11-185762 |
| Aug. 11, 1999 | (JP) | 11-227996 |

(51) Int. Cl.$^7$ .................................................. G06F 17/30
(52) U.S. Cl. .................................. 707/6; 348/19; 382/190
(58) Field of Search .................................. 707/6; 348/19; 382/190

(56) References Cited

U.S. PATENT DOCUMENTS

| 5,526,407 | * | 6/1996 | Russell et al. | 379/88.01 |
| 5,561,718 | * | 10/1996 | Trew et al. | 382/118 |
| 5,612,730 | | 3/1997 | Lewis . | |
| 5,708,825 | | 1/1998 | Sotomayor . | |
| 5,768,578 | * | 6/1998 | Kirk et al. | 707/100 |
| 5,802,208 | * | 9/1998 | Podichuk et al. | 382/224 |
| 5,821,987 | * | 10/1998 | Larson | 348/14.15 |
| 5,901,244 | * | 5/1999 | Souma et al. | 382/190 |
| 5,974,413 | * | 10/1999 | Beauregard et al. | 707/6 |
| 5,982,912 | * | 11/1999 | Fukui et al. | 382/118 |
| 5,983,218 | | 11/1999 | Mahmood . | |
| 5,983,237 | * | 11/1999 | Jain et al. | 707/104 |
| 6,081,750 | * | 6/2000 | Hoffberg et al. | 700/17 |
| 6,184,926 | * | 2/2001 | Khosravi et al. | 348/239 |
| 6,199,076 | * | 3/2001 | Logan et al. | 707/501 |
| 6,226,678 | * | 5/2001 | Mattaway et al. | 709/230 |

FOREIGN PATENT DOCUMENTS

| 11-066106 | 3/1999 | (JP) . |
| WO 97/41690 | 11/1997 | (WO) . |
| WO 98/35304 | 8/1998 | (WO) . |
| WO 98/36552 | 8/1998 | (WO) . |
| WO 98/56188 | 12/1998 | (WO) . |
| WO 99/30255 | 7/1999 | (WO) . |

OTHER PUBLICATIONS

Home page address http://www.GolfDigest.com, pp. 1–2, Dec. 1999.

* cited by examiner

*Primary Examiner*—Wayne Amsbury
(74) *Attorney, Agent, or Firm*—Oblon, Spivak, McClelland, Maier & Neustadt, P.C.

(57) ABSTRACT

In information interchange between a first station and a second station, the second station changes and recognizes the semantic contents of information transmitted from the first station on the basis of information in an information base in response to the first station and determines the optimum response on the basis of the result of the recognition for selecting, manipulating or converting information optimum for each first station with information in the information base and transmitting the same to the first station on the basis of the determination. The quantity of information to be extracted from a user can be reduced by employing the information already present in the information base, for reaching desired information with a sense as if a familiar operator talks with the user. Thus, information service convenient for the user is provided.

46 Claims, 16 Drawing Sheets

INFORMATION COMMUNICATION SYSTEM

BACKGROUND OF THE INVENTION

1. Field of the Invention

The present invention relates to an information communication system making information communication between a second station and a first station.

2. Description of the Background Art

A visual telephone system (electronic talking system) using a public telephone line such as an analog line is now coming into wide use. This system transmits/receives a voice signal and an image signal through a communication unit storing a CCD camera or the like when making a call with a telephone set. The system transmits received voice and image signals to a video input terminal of a general television set for reproducing the voice and the image on the television set. This visual telephone system can provide various types of service between a second station (host base station or the like) and a first station (terminal unit or the like) remote from the second station for returning various types of response information for various types of requirement from a user of the first station.

FIG. 16 shows an exemplary visual telephone system (electronic talking system). When a user makes a call with a telephone set 1, this system transmits/receives a voice signal and an image signal through a communication unit 3 storing a CCD camera 2, transmits the received voice and image signals to a video input terminal of a general television set 4 and reproduces the voice and the image with the television set 4. Throughout the specification, the term "video input terminal" includes not only an image input terminal but also a voice input terminal.

The voice and the image can be reproduced on the television set 4 automatically in talking with the telephone set 1 or by inputting a switch on the communication unit 3 with an operation feeling similar to that for reproduction of a video image through a free channel among a plurality of channels for television broadcasting or a video reproduction mode.

The system is connected to the public telephone line through a general modular connector 5 having two or four cores, whereby a visual telephone call can be made in a general office or home with no requirement for specific connection work.

Such an electronic talking system employs a compression/expansion mode according to the visual conference standardization mode (H.324) of ITU (International Telecommunication Union) in relation to communication signals such as the aforementioned voice and image signals. Thus, protocol compatibility of communication signals is preserved between various types of machines, so that excellent bidirectivity can be attained over a wide region.

FIG. 17 schematically illustrates this visual conference standardization mode (H.324). This is a protocol mode formed on the premise of a network interface 11, which is a connection standard with a public telephone line, utilizing a modem 12 of a general standard such as V.34, V.8 or V.8 bis and employing a multimedia multiplex/synchronous (H.223) mode 13 for transmitting a plurality of packets 14 to 17. Four types of packet boxes including system control (H.245) 14, voice coding (G.723.1) 15, video coding (H.263, H.261) 16 and T.120 (V.14, LAPM etc.) 17 for transmitting an auxiliary device signal of depiction data on a white board or the like are defined as these packets 14 to 17, and data are stored in these packets 14 to 17 and transmitted at need. Referring to FIG. 17, numeral 18 denotes a call control domestic standard mode defining timings for making a call and return in signal transmission.

Such an electronic talking system is, for example, (1) used by a person taking up a post alone without his family, studying abroad or under medical treatment/in hospital for seeing how things are going with/cheering up the family or making contact with a close friend or relation;

(2) used by a person having no hearing for making a telephone call while observing a TV screen;

(3) used in a store or the like for grasping/patrolling/monitoring the situation inside the store;

(4) used for introducing new products or information to customers, business education, information transmission or the like;

(5) used for daily business communication with a person working at home for his company or between domestic and overseas branches or factories, or communication with the head office when on a domestic or overseas business trip;

(6) used for interactive remote education in a cramming school or a language school;

(7) used for private investment consultation between a financial institution and a special customer at home;

(8) used for remote medical care or simple medical examination by interview;

(9) used by an advertising agency or a model agency for presentation, audition or interviewing;

(10) used by a specialist such as a lawyer, a patent attorney or a licensed tax accountant for making arrangements with a client;

(11) used for interactive consultation such as management or employment consultation;

(12) used for video-on-demand (VOD) network expansion in mail-order business or the like; and

(13) used for communication with a country or region retarded in popularization of ISDN (digital) lines.

In particular, this electronic talking system transmitting signals to the video input terminal of the general television set 4 so that the television set 4 reproduces the voice and the image is advantageously easy to get used to as compared with a visual telephone on the Internet employing a personal computer, in such a point that a person unfamiliar with the so-called PC (personal computer) or a high-tech apparatus can readily make a call with a visual telephone.

In an information communication system utilizing a general visual conference system (electronic talking system), however, a terminal user is supplied with only information such as an image of an operator or the operator's voice, and the types of providable information are extremely limited. However, one may wish to make a call not only through conversation with the operator through the image and the voice but also through on-screen display of desired materials such as character information and image information. For example, a person concerned with a cramming school or a consultant may wish to explain the contents of learning or financial charts displayed in real time through the function of the electronic talking system.

When a user requires a prescribed detailed image to an operator, the image may be faxed or an image file may be added to an electronic mail, for example. However, direct recognition of image information on a visual conference system is not performed in general.

Recently information provision service utilizing the Internet is made all over the word. In this case, the user browses a number of contents in a wide-area network such as the World Wide Web (WWW), through which languages described in the HTML (Hyper Text Markup Language) form can be displayed on a monitor of a personal computer or the like with a software program called a browser. According to this method, various types of information such as character information data, still picture data, motion picture data, voice data and various types of archive files can be transferred•provided in a general communication mode called TCP/IP.

Particularly as a method for providing information with no labor in a second station, there is information retrieval service utilizing a prescribed retrieval system employing a computer. In this case, a first station connected through the Internet operates a retrieval system stored in the second station as an application software program, so that the user can browse favorite contents information by inputting a keyword for retrieval in a prescribed input column and selecting, manipulating or converting a desired item in a list of "linkage screens" displayed as a result of the retrieval. When employing the retrieval system using the computer, therefore, desired information can be relatively readily provided to the user with no specific staff. When the quantity of the contents of explanatory materials is large, the so-called hyperlink function may be introduced into the explanatory materials, which in turn are displayed on a screen so that the explainer (transmitter of material information) or the observer (receiver of the material information) can arbitrarily jump to other relevant materials one after another.

However, the conventional system of making a visual telephone call with the aforementioned general television set 4 allows no browsing of WWW contents simultaneously with talking.

There is application software allowing a call similar to a visual telephone call on the Internet through modem connection in the so-called PC. It is technically possible to simultaneously perform such a pseudo-visual telephone call and browsing of WWW contents by performing prescribed setting support on the side of a service provider (ISP: Internet service provider) providing Internet connection service. However, such connection accompanied with manipulation of a mouse or a keyboard of the PC is hard for a person unfamiliar therewith, and may not necessarily be suitable for a cramming school for children or business consultation for elderly proprietors.

While it is also possible to make a visual telephone call with the television set 4 and the communication unit 3 while connecting a PC to the Internet and browsing WWW contents or the like with the PC, the PC must be manipulated and at least two connection routes to the public telephone line are required in this case, to result in a high connection charge or extension of the telephone line as the case may be.

When the user requires information to the operator, processing may be so uniformalized that it is difficult to attain processing suitable to each user depending on the prepared information. In particular, the user generally must repeat similar questions although he has had the same information service a number of times, and it is difficult to provide information service with such a sense that a familiar operator makes conversation with the user.

Further, various types of retrieval service employ a simple method of inputting a prescribed keyword for reaching information required by the user, and hence the results of the retrieval themselves are so enormous that considerable labor is required for reaching desired information in a list of retrieval results. In addition, whether or not the input keyword matches with a keyword previously prepared in the retrieval system depends on the thesaurus. If the keyword input by the user mismatches with the keyword prepared in the retrieval system, therefore, the user cannot reach the desired information.

SUMMARY OF THE INVENTION

Accordingly, an object of the present invention is to provide an electronic taking system capable of, when readily making a visual telephone call on a general television set, readily displaying relevant materials for browsing on the television set at the same time.

Another object of the present invention is to provide an information communication system easy to handle for a user in information interchange between a first station and a second station.

A first aspect of the present invention is directed to an information communication system for making telephone calls between a plurality of electronic talking terminals and a host base station, in which the host base station at least comprises a host microphone apparatus inputting the voice of an operator in the host base station, a display displaying an image as to prescribed information and a host control part transmitting/receiving a signal related to at least the voice of the operator to/from each electronic talking terminal, each electronic talking terminal at least comprises a branch microphone apparatus inputting the voice of each terminal user, and a branch control part connected to a prescribed terminal of a television set receiving public television broadcasting for transmitting/receiving a signal related to at least a voice to/from the host base station, the host control part has a function connected to the Internet for capturing Web information in the Internet and displaying the Web information on at least a part of the display, a function of transmitting the downloaded Web information to each electronic talking terminal along with the signal related to the voice of the operator input at least through the host microphone apparatus, and a function of outputting the voice of each terminal user through a prescribed speaker on the basis of a signal related to at least the voice of each terminal user transmitted from each electronic talking terminal, and the branch control part has a function of transmitting at least the signal related to the voice of each terminal user input in the branch microphone apparatus to the host base station, a function of outputting the voice of the operator through the television set on the basis of the signal related to the voice of the operator received from the host base station, and a function of displaying the Web information received from the host base station on the television set.

According to a second aspect of the present invention, the host base station further comprises a host television camera acquiring an image of the operator in the host base station, the host control part further comprises a function of transmitting a signal related to the image of the operator acquired by the host television camera to each electronic talking terminal along with the Web information and the signal related to the voice of the operator input through the host microphone apparatus, and the branch control part further comprises a function of displaying an image transmitted from each electronic talking terminal on another part of the display simultaneously with the Web information.

According to a third aspect of the present invention, each electronic talking terminal further comprises a branch television camera acquiring an image of the terminal user, the branch control part further comprises a function of transmitting a signal related to the image of the terminal user acquired by the branch television camera to the host base station along with the signal related to the voice of the terminal user input through the branch microphone apparatus, and the host control part further comprises a function of displaying the image of the terminal user transmitted from each electronic talking terminal on another part of the display simultaneously with the Web information.

According to a fourth aspect of the present invention, each electronic talking terminal further comprises a branch input unit for specifying a hyperlink introduced into the Web information and inserted in linkage to require Web information of another address or for specifying the address of the Web information requiring receiving on the branch control part, the branch control part further has a function of requiring information of the hyperlink or the address specified by the branch input unit to the host base station by transmission, and the host control part further comprises a function of downloading Web information related to the hyperlink or the address from the Internet when the information of the hyperlink or the address is transmitted from the branch control part and distributing the Web information to the branch control part.

According to the first to fourth aspects of the present invention, the electronic talking terminal and the host base station make mutual communication through electronic talking with at least voices while Web information specified by the host base station is screen-displayed on both sides. Thus, when making management•employment consultation or keeping a cramming school or the like through communication between offices or between an office and a home, for example, electronic talking can be readily made while observing the same Web information. In particular, each electronic talking terminal can make a telephone call and display Web information through a general television set without using the so-called PC, whereby the telephone call operation can be made as if operating a video recorder without employing an input unit such as a keyboard or a mouse accompanying the PC for maintaining simple operability.

According to the second and third aspects of the present invention, a telephone call can be made through the electronic talking terminal not only with the voice of the operator of the host base station but also with observation of the image of the operator. Thus, the telephone call can be made while simultaneously observing the expression of the counterpart of communication and the Web information. Therefore, the present invention can be effectively applied to one-way information transmission in training or information provision provided from the host base station to each electronic talking terminal.

According to the third aspect of the present invention, the host base station can also make a telephone call not only with the voice of the user of each electronic talking terminal but also with observation of the image of the user. Thus, the telephone call can be made while simultaneously observing the expression of the counterpart of communication and the Web information. Therefore, the present invention can be effectively applied to a bidirectional transmission type telephone call in consultation or talking between acquaintances.

According to the fourth aspect of the present invention, the user of each electronic talking terminal can require desired Web information th rough the terminal input unit so that the host base station transmits the required Web information to each electronic talking terminal and displays the same on a television set of each electronic talking terminal in response t o the requirement for improving convenience.

Also in this case, the telephone call is made while displaying only the Web information transmitted from the host base station on the television set for a user unfamiliar with the terminal input unit. Thus, no unnecessary burden is put on such a user.

A fifth aspect of the present invention is directed to an information communication system for making information interchange between a plurality of first stations having communication functions and a prescribed second station having a communication function through a communication path, having a information base including various types of information arranged on at least one of the second station, the first stations and a third station other than the first and second stations, in which the second station comprises an information recognition part recognizing the semantic contents of information transmitted from each first station on the basis of information in the information base, a response determination part determining the optimum response on the basis of the result of the recognition, and an optimum information preparation part preparing transmission information with information in the information base on the basis of the determination and transmitting the transmission information to each first station.

According to the fifth aspect of the present invention, the second station recognizes the semantic contents of the information transmitted from each first station on the basis of information in the information base in response to each first station for determining the optimum response on the basis of the result of the recognition, preparing information optimum to each first station and transmitting the optimum information with information in the information base on the basis of the determination, whereby information retrieval processing can be optimized for each user and uniformalization of the processing can be prevented. In particular, the user may not repeat questions as to already recognized information in the information base, and hence he can reach desired information with a sense as if making conversation with a familiar operator and the processing efficiency can be remarkably improved when retrieving information in an interactive question form.

According to a sixth aspect of the present invention, the second station has a second station information base as at least part of the information base, and the second station information base stores information along with an index accompanying the information.

According to the sixth aspect of the present invention, the second station information base stores information along with the index accompanying the same, whereby the second station can send only the index to each first station.

According to a seventh aspect of the present invention, a hierarchical structure is defined for the index to express a conceptual hierarchical structure of the information.

According to the seventh aspect of the present invention, the hierarchical structure is defined for the index. Thus, the second station can search for information closest to that required by the first station on the basis of the hierarchical index.

According to an eighth aspect of the present invention, the response determination part retrieves, when any first station requires provision of information and the required information is absent, information closest to the required information on the basis of the hierarchical index.

According to the eighth aspect of the present invention, the response determination part searches for information closest to that required by the first station on the basis of the hierarchical index. Thus, even if the desired information is absent, the requirement from the operator of the first station can be satisfied.

According to a ninth aspect of the present invention, the second station has a second station information base as at least part of the information base, and the second station information base stores user information related to each first station.

According to the ninth aspect of the present invention, the second station information base stores the user information. Thus, the second station can provide service specific to the first station to the first station.

According to a tenth aspect of the present invention, the second station has a second station information base as at least part of the information base, and the second station information base stores data defining relation between a plurality of information as sub-storage/hierarchical storage information.

According to the tenth aspect of the present invention, the second station information base stores data defining the relation between a plurality of information as sub-storage/hierarchical storage information. Thus, the second station can search for information closest to that required by the first station on the basis of the sub-storage/hierarchical storage information.

According to an eleventh aspect of the present invention, the response determination part retrieves, when any first station requires provision of information and the required information is absent, related information on the basis of the hierarchical index.

According to the eleventh aspect of the present invention, the response determination searches for information related to the information required by the first station on the basis of the sub-storage/hierarchical storage information. Therefore, even if the required information is absent, the requirement from the operator of the first station can be satisfied.

According to a twelfth aspect of the present invention, each first station comprises a user interface having a communication medium mediating transfer of information between the first station and an operator of the first station, and an input/output optimization part adjusting the signal quantity of information to be transmitted in response to the form of the information mediated by the user interface and the state of the communication path.

According to the twelfth aspect of the present invention, unwasteful efficient communication is implemented due to the provision of the input/output optimization part.

According to a thirteenth aspect of the present invention, each first station comprises a priority processing part assigning priority to information to be transmitted and preferentially transmitting information having higher priority to the communication path.

According to the thirteenth aspect of the present invention, user-friendly communication is implemented along the user's desire due to the provision of the priority processing part on the first station.

According to a fourteenth aspect of the present invention, each first station comprises a user interface having a communication medium mediating transfer of information between the first station and an operator of the first station, and an operation system optimization part setting, a plurality of selectable operation modes for the user interface on the basis of operation of the operator of the first station.

According to the fourteenth aspect of the present invention, operations of the user interface can be customized in response to the user's liking due to the provision of the operation system optimization part on the first station.

According to a fifteenth aspect of the present invention, each first station comprises a user interface having a plurality of communication media mediating transfer of information between the first station and an operator of the first station, and a conversion processing part selectively turning off the plurality of communication media.

According to the fifteenth aspect of the present invention, privacy can be properly protected due to the provision of the conversion processing part on the first station.

According to a sixteenth aspect of the present invention, the conversion processing part further transmits another information in place of information to be essentially transmitted by any of the communication media selectively turned off.

According to the sixteenth aspect of the present invention, the conversion processing part transmits another information in place of information to be essentially transmitted by a communication medium selectively turned off. Thus, deficiency of information can be made up for the counterpart of communication while protecting privacy.

According to a seventeenth aspect of the present invention, each first station comprises a first station information base as at least part of the information base, and an information selection part selecting information including previously set specific information from a plurality of information transmitted by the second station and recording the information in the first station information base.

According to the seventeenth aspect of the present invention, only necessary information can be selectively stored in the first station information base due to the provision of the information selection part on the first station.

According to an eighteenth aspect of the present invention, each first station comprises a communication interface connected to an end of the communication path, and the communication interface comprises a protocol conversion part superposing information of another form on a blank area of a protocol of visual telephone communication and transmitting the information to the communication path and separating the information of another form superposed on the protocol received through the communication path.

According to a nineteenth aspect of the present invention, the second station comprises a communication interface connected to an end of the communication path, and the communication interface comprises a protocol conversion part superposing information of another form on a blank area of a protocol of visual telephone communication and transmitting the information to the communication path and separating the information of another form superposed on the protocol received through the communication path.

According to the eighteenth and nineteenth aspects of the present invention, visual telephone communication and information communication of another form can be simultaneously made while employing a single path as the communication path due to the provision of the protocol conversion part.

According to a twentieth aspect of the present invention, each first station comprises a communication interface connected to an end of the communication path, and the communication interface comprises a composite error correction part detecting an error included in information received through the communication path and selectively executing any of error correction, requirement for retransmission of information, no error correction and manipulation on the received information in response to the form of the received information.

According to a twenty-first aspect of the present invention, the second station comprises a communication interface connected to an end of the communication path, and the communication interface comprises a composite error correction part detecting an error included in information received through the communication path and selectively executing any of error correction, requirement for retransmission of information, no error correction and manipulation on the received information in response to the form of the received information.

According to the twentieth and twenty-first aspects of the present invention, processing related to error correction is efficiently performed due to the provision of the composite error correction part.

According to a twenty-second aspect of the present invention, the information recognition part comprises a plurality of recognition parts extracting features from a plurality of forms of information, a data classification part distributing information received through the communication path to the plurality of recognition parts in response to the form thereof, and a demand recognition part recognizing the contents of requirement from each first station on the basis of features extracted by at least one of the plurality of recognition parts.

According to the twenty-second aspect of the present invention, features are properly extracted in response to the form (image, voice, character etc.) of received information due to the provision of the plurality of recognition parts, the data classification part and the demand recognition part on the information recognition part for implementing proper recognition of required contents on the basis thereof.

According to a twenty-third aspect of the present invention, the information base stores information related to the first stations, and at least one of the plurality of recognition parts extracts features with reference to the information related to the first stations.

According to the twenty-third aspect of the present invention, at least one of the plurality of recognition parts extracts features with reference to the information related to the first stations. Thus, the certainty of recognition is improved.

According to a twenty-fourth aspect of the present invention, the information recognition part further comprises an evaluation function part making authentication as to whether or not an operator of each first station is the right person on the basis of the feature s extracted by at least one of the plurality of recognition parts.

According to the twenty-fourth aspect of the present invention, authentication is performed on the basis of the features of th e received information. Thus, security can be improved without forcing the operator of the first station to a complicated procedure for authentication.

According to a twenty-fifth aspect of the present invention, the demand recognition part refer s to the information base in addition to recognition of the contents of requirement from th e first station thereby inferring further detailed contents of requirement.

According to the twenty-fifth aspect of the present invention, the demand recognition part infers not only the required contents transmitted from the first station but also more detailed required contents. Thus, high-quality information can be provided to the first station.

According to a twenty-sixth aspect of the present invention, at least one of the plurality of recognition parts extracts features by utilizing arithmetic processing by the third station.

According to the twenty-sixth aspect of the present invention, at least one of the plurality of recognition parts utilizes arithmetic processing by the third station. Thus, the burden on the processing of the second station can be reduced.

According to a twenty-seventh aspect of the present invention, the response determination part limits the depth and width of retrieval when retrieving information on the basis of the index for which the hierarchical structure is defined.

According to the twenty-seventh aspect of the present invention, the response determination part limits the depth and width of retrieval when retrieving information on the basis of the index for which the hierarchical structure is defined. Thus, wasteful retrieval can be reduced and efficient information provision can be performed.

According to a twenty-eighth aspect of the present invention, the index includes an ambiguous parameter for which correspondence or non-correspondence is not univocally ascertained, and the response determination part comprises an ambiguous retrieval part retrieving information on the basis of the ambiguous parameter when requirement for provision of information is received from any first station while determining whether or not the ambiguous parameter corresponds to the requirement.

According to the twenty-eighth aspect of the present invention, retrieval close to human determination is flexibly performed due to the provision of the ambiguous retrieval part on the response determination part.

According to a twenty-ninth aspect of the present invention, at least one of the plurality of recognition parts extracts physical features of an operator of each first station, and the response determination part comprises an ambiguous retrieval part retrieving information from the information base in consideration of the extracted physical features.

According to the twenty-ninth aspect of the present invention, information specific to the operator can be provided in consideration of the physical features of the operator due to the provision of the ambiguous retrieval part on the response determination part.

According to a thirtieth aspect of the present invention, the information base stores information related to past facts, and the response determination part comprises an example base part retrieving, when requirement for provision of information is received from any first station, information responsive to the requirement from the information base with reference to the information related to past facts.

According to the thirtieth aspect of the present invention, proper information can be provided in consideration of past facts due to the provision of the example base part on the response determination part.

According to a thirty-first aspect of the present invention, the optimum information preparation part comprises a selection•sending priority part selecting, when receiving requirement for provision of information from any first station, only partial information suitable to the requirement from information retrieved in the response determination part and transmitting the partial information to the communication path.

According the thirty-first aspect of the present invention, unwasteful information provision is enabled due to the provision of the selection•sending priority part on the optimum information preparation part.

According to a thirty-second aspect of the present invention, the optimum information preparation part comprises a selection•sending priority part selecting response by an operator of the second station when receiving requirement from any first station or the second station cannot automatically respond.

According to the thirty-second aspect of the present invention, a proper response to the first station is not interrupted even if the operability of the second station is limited due to the provision of the selection•sending priority part on the optimum information preparation part. Further, not only the information in the information base but also information corresponding to a prescribed operator is included as the information provided from the second station to the first station, whereby the quality of correspondence service for the user can be improved. When proper information desired by the user cannot be searched for and an automatic response is disabled, the operator responds in an interactive mode. Thus, as compared with such a case that the operator necessarily responds in an interactive mode in all cases, the number of operators can be minimized so that a large number of operators may not wait.

According to a thirty-third aspect of the present invention, the optimum information preparation part comprises a selection•sending priority part preferentially transmitting information having a smaller information quantity to the communication path among information to be transmitted to the communication path.

According to the thirty-third aspect of the present invention, economic information provision is implemented due to the provision of the selection•sending priority part on the optimum information preparation part.

According to a thirty-fourth aspect of the present invention, the optimum information preparation part comprises a manipulation processing part changing, when information read from the information base on the basis of the result of retrieval by the response determination part includes a part mismatching with requirement from any first station, the mismatching part to match with the requirement.

According to the thirty-fourth aspect of the present invention, information satisfying the operator of the first station can be provided while making up deficiency of information in the information base due to the provision of the manipulation processing part on the optimum information preparation part.

According to a thirty-fifth aspect of the present invention, the optimum information preparation part comprises a conversion processing part translating information read from the information base on the basis of the result of retrieval by the response determination part into a language suitable for an operator of any first station.

According to the thirty-fifth aspect of the present invention, the operator of the first station can receive information without feeling a language barrier due to the provision of the conversion processing part on the optimum information preparation part.

According to a thirty-sixth aspect of the present invention, the second station further comprises a compression processing part compressing information transmitted from the optimum information preparation part to the communication path, and the optimum information preparation part comprises a determination•adjustment part adjusting, when information read from the information base includes image information, a frame number and compressibility in the compression processing part for the image information.

According to the thirty-sixth aspect of the present invention, the quantity of signals transmitted to the communication path can be properly set due to the provision of the determination•adjustment part on the optimum information preparation part.

According to a thirty-seventh aspect of the present invention, the determination•adjustment part adjusts the frame number and the compressibility in response to the character of the image information.

According to the thirty-seventh aspect of the present invention, the determination•adjustment part adjusts the frame number and the compressibility in response to the characters of the image information. Thus, the first station is provided with image information having proper picture quality responsive to the characters of the image information.

According to a thirty-eighth aspect of the present invention, the optimum information preparation part comprises a determination adjustment part preferentially culling an image of a screen having no motion with respect to motion information to be transmitted to the communication path so that a reproduction time for the motion information and voice information accompanying the motion information is within a target range, preferentially culling a silent part with respect to the voice information, and further performing pitch conversion when a non-silent part must be culled.

According to the thirty-eighth aspect of the present invention, the reproduction time for motion picture information and voice information transmitted to the communication path can be kept in the target range due to the provision of the determination•adjustment part on the optimum information preparation part.

According to a thirty-ninth aspect of the present invention, the optimum information preparation part comprises an index addition part adding an index to information transmitted to the communication path.

According to the thirty-ninth aspect of the present invention, the first station can retrieve necessary information on the basis of the index due to the provision of the index addition part on the optimum information preparation part.

According to a fortieth aspect of the present invention, each first information comprises a first station information base as at least part of the information base, and an information selection part selecting information to which a previously set specific index is added from a plurality of information transmitted by the second station and recording the information in the first station information base.

According to the fortieth aspect of the present invention, the first station information base can selectively store only necessary information due to the provision of the information selection part on the first station.

According to a forty-first aspect of the present invention, the second station further comprises an information transmission part interposed between the optimum information preparation part and the communication path for processing information output from the optimum information preparation part, and the optimum information preparation part comprises a compression control part controlling compressibility in the compression processing part so that the signal quantity of information transmitted to the communication path is within a target range.

According to the forty-first aspect of the present invention, the quantity of signals transmitted to the communication path is adjusted in a proper range due to the provision of the compression control part on the optimum information preparation part.

According to a forty-second aspect of the present invention, the second station further comprises an information transmission part interposed between the optimum information preparation part and the communication path for processing information output from the optimum information preparation part, and the information transmission part comprises a data final adjustment part establishing priority among the output information in response to the form of the information and transmitting the information to the communication path sequentially from information having higher priority to the communication path.

According to the forty-second aspect of the present invention, the data length (total quantity of signals) of information transmitted to the communication path can be set in a target range due to the provision of the data final adjustment part on the information transmission part.

According to a forty-third aspect of the present invention, the second station further comprises an information transmission part interposed between the optimum information preparation part and the communication path for processing information output from the optimum information preparation part, and the information transmission part comprises a compression processing part compressing the output information, and a data final adjustment part controlling compressibility in the compression processing part so that the signal quantity of information transmitted to the communication path is within a target range.

According to the forty-third aspect of the present invention, the signal quantity (transmission rate) of information transmitted to the communication path is kept in a target range due to the provision of the data final adjustment part on the information transmission part.

According to a forty-fourth aspect of the present invention, the second station further comprises an information transmission part interposed between the optimum information preparation part and the communication path for processing information output from the optimum information preparation part, and the information transmission part comprises a data final adjustment part establishing priority for the output information on the basis of importance thereof and preferentially transmitting information having higher priority to the communication path.

According to the forty-fourth aspect of the present invention, the operator of the first station can preferentially obtain important information due to the provision of the data final adjustment part on the information transmission part.

According to a forty-fifth aspect of the present invention, the information base stores sending history information which is data related to information sent in the past, the second station further comprises an information transmission part interposed between the optimum information preparation part and the communication path for processing information output from the optimum information preparation part, and the information transmission part comprises a sending determination part deleting information having history transmitted to any first station in the past from the output information on the basis of the sending history information and transmitting the information to the communication path.

According to the forty-fifth aspect of the present invention, wasteful retransmission of the same information to the same first station can be removed due to the provision of the sending determination part on the information transmission part.

According to a forty-sixth aspect of the present invention, the second station further comprises an information transmission part interposed between the optimum information preparation part and the communication path for processing information output from the optimum information preparation part, and the information transmission part comprises an encryption processing part performing encryption selected from a plurality of encryption methods on the output information.

According to the forty-sixth aspect of the present invention, encryption can be performed at different encryption levels in response to the counterpart of communication, the contents of communication, the form of information to be transmitted and the like, for example, due to the provision of the encryption processing part on the information transmission part.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First to third embodiments of the present invention are now described in relation to an electronic talking system capable of readily displaying relevant materials for browsing on a general television set at the same time when simply making a visual telephone call on the telephone set.

First Embodiment

Figure 1:
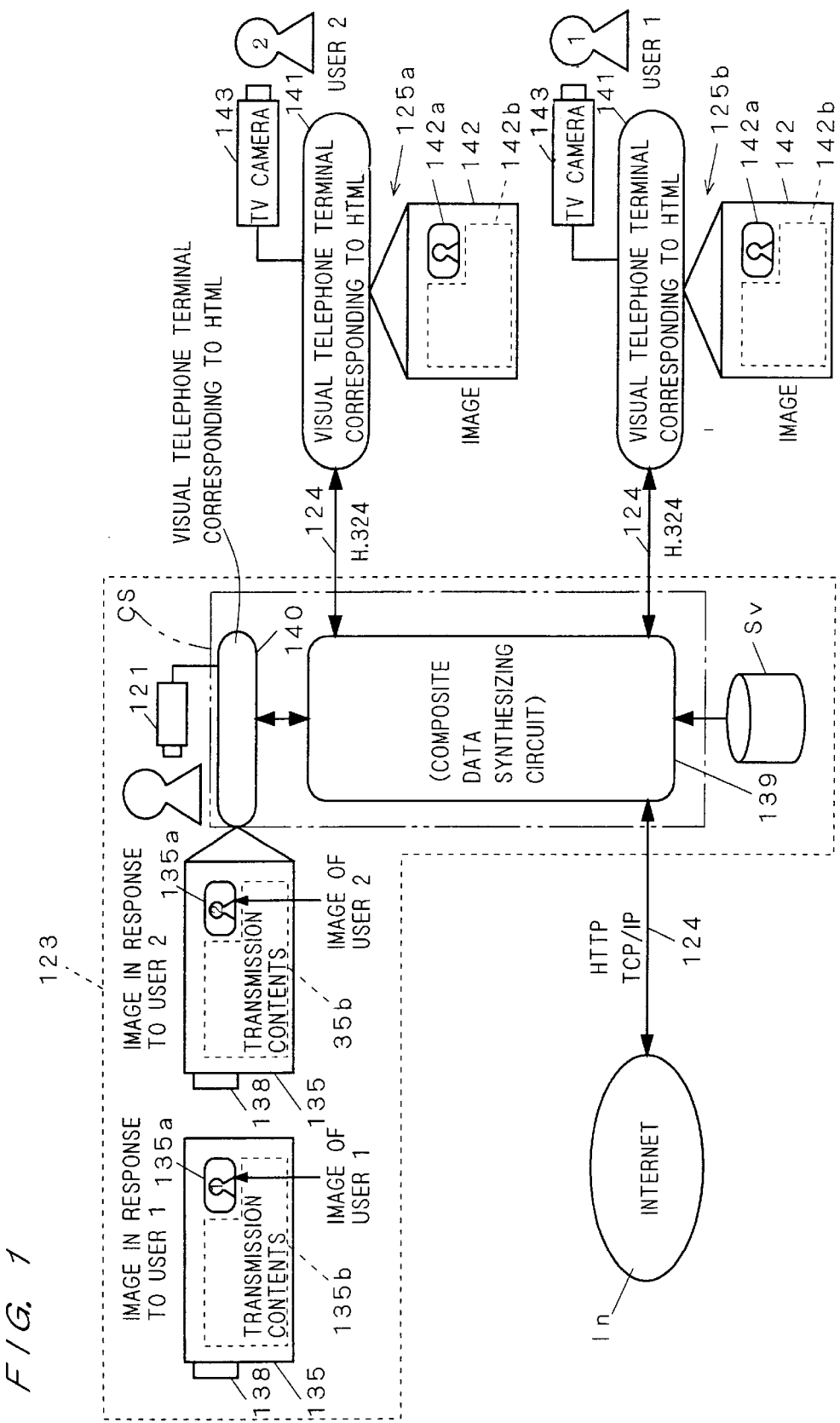
FIG. 1 is a block diagram showing an exemplary electronic talking system according to a first embodiment of the present invention.

FIG. 1 is a block diagram showing an electronic talking system according to the first embodiment of the present invention. This electronic talking system (visual telephone system) displays WWW contents on the Internet In on the screens of television sets along with voices and images in multi-windows when a lecturer or an instructor and a trainee or a consulter make a bidirectional telephone call through the television sets in a cramming school, management guidance, a job placement office or the like, for example.

As shown in FIG. 1, the electronic talking system is formed by a Web contents transmission host base station 123 having a TV camera 121 and a computerizing system CS (host control part) and a plurality of visual telephone terminals (electronic talking terminals) 125a and 125b connected to the Web contents transmission host base station 123 through communication lines 124, which are public telephone lines.

The Web contents transmission host base station 123, making communication with the visual telephone terminals 125a and 125b in the H.324 mode shown in FIG. 17 through the communication lines 124, is connected with the Internet In through an ISDN communication network or an optical communication network, for example, so that WWW contents obtained through the Internet In described later can be downloaded to a prescribed server (mass storage: proxy server) Sv connected to the computerizing system CS.

The Internet In is a worldwide computer network formed by some basic networks with application of a communication protocol (communication connection means) of the TCP/IP (Transmission Control Protocol/Internet Protocol) mode capable of connecting different types of machines. Servers (mass storages) serving as communication nodes on a number of service providers (ISP: Internet service providers) respectively store various WWW contents and the like so that the same can be browsed through a terminal such as a PC connected to the Internet In. The WWW contents, which are generally referred to as home pages, can be displayed on the display of a PC or the like in a language described in the HTML (Hypertext Markup Language) form with a browsing software program referred to as a browser. However, the Web contents transmission host base station 123 according to this embodiment does not connect a general display for a computerizing system but displays information such as the WWW contents on prescribed areas 135b of displays 135 using general television sets. When downloading the WWW contents from the Internet In, character information or image information is downloaded by inputting a URL address or clicking a hyperlink part with an input unit such as a mouse through an operation similar to that performed in a general PC and stored (cached) in the server Sv.

The TV camera 121 in the Web contents transmission host base station 123 stores a microphone (not shown) inputting voices, for acquiring an image of a host station operator with the TV camera 121 and inputting the voice of the host station operator with the stored microphone.

Figure 2:
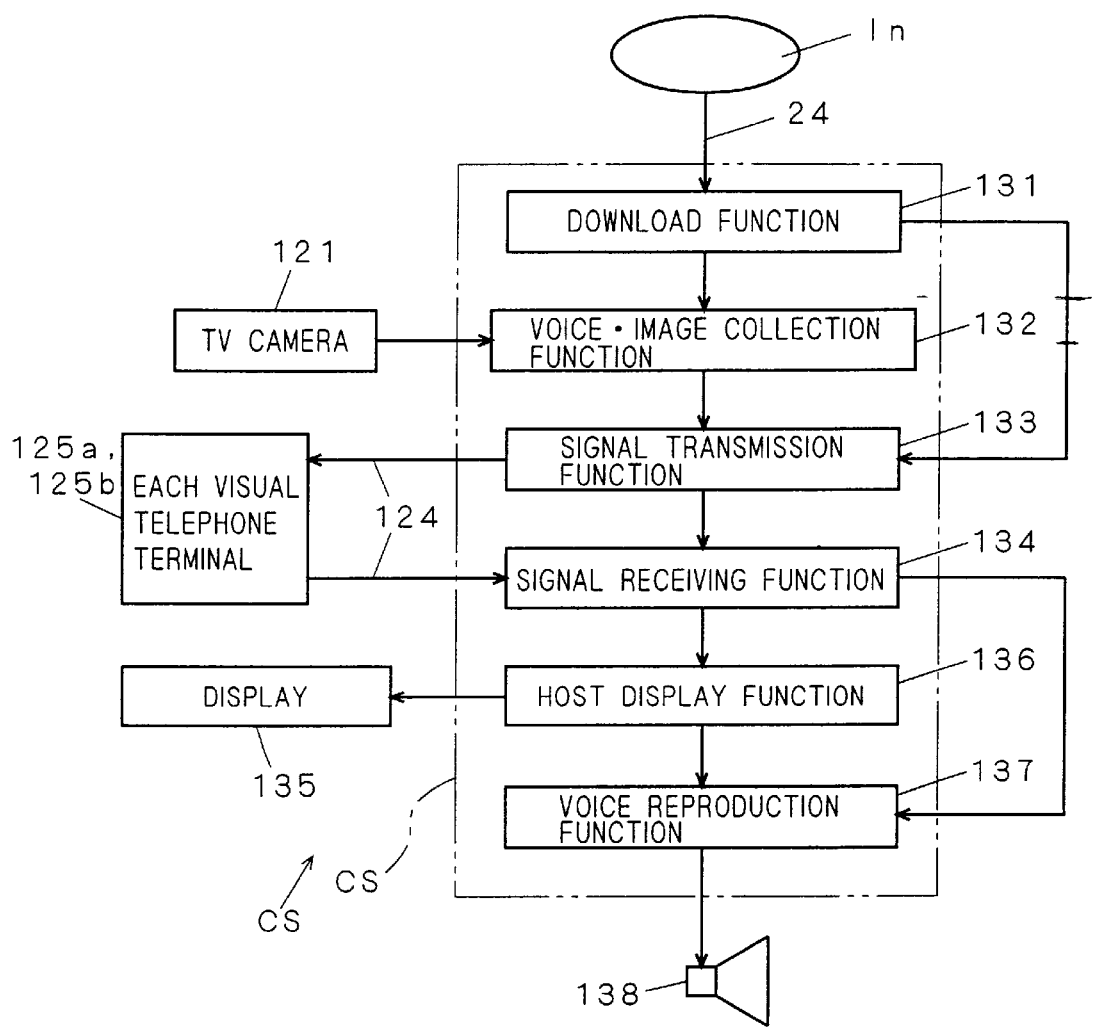
FIG. 2 is a block diagram showing a Web contents transmission host base station.
Figure 17:
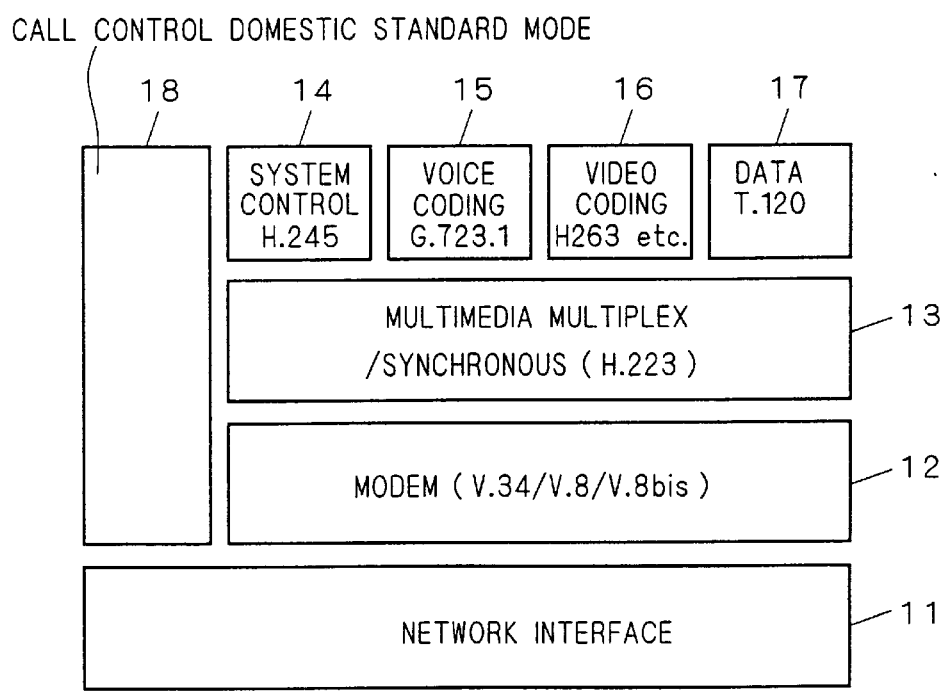
FIG. 17 schematically illustrates a general visual conference standardization mode (H.324).

As shown in FIG. 2, the computerizing system CS of the Web contents transmission host base station 123 has a download function 131 selecting WWW contents (HTTP) in the Internet In in the TCP/IP mode and downloading the same to the server Sv, a voice•image collection function 132 collecting (inputting and acquiring) the voice and the image of the host station operator with the TV camera 121, a signal transmission function 133 transmitting the voice and the image collected by the voice•image collection function 132 and the WWW contents downloaded by the download function 131 to the visual telephone terminals 125a and 125b as signals of the H.324 mode shown in FIG. 17 through the public telephone lines 124, a signal receiving function 134 receiving signals of the H.324 mode from the visual telephone terminals 125a and 125b through the public telephone lines 124, a host display function 136 reproducing•displaying the WWW contents transmitted through the signal transmission function 133 and images from the visual telephone terminals 125a and 125b received in the signal receiving function 134 on prescribed areas 135a and 135b of the screens of the displays 135 in multi-windows respectively, and a voice reproduction function 137 outputting voice signals from the visual telephone terminals 125a and 125b received in the signal receiving function 134 to speakers 138 of the television sets (displays 135) for reproducing voices.

A host visual telephone controller 140 in the computerizing system CS manages the voice•image collection function 132, the host display function 136 and the voice reproduction function 137, while a composite data synthesizing circuit 139 in the computerizing system CS manages a function of synthesizing the voices and images collected by the voice•image collection function 132 and the WWW contents downloaded by the download function 132 as composite data in the signal transmission function 133. In particular, the composite data synthesizing circuit 139 has a function of receiving the voice signal from the TV camera 121 through the host visual telephone controller 140, thereafter voice-coding the same (numeral 15 in FIG. 17) in the general G.723.1 mode, receiving the image signal from the TV camera 121 through the host visual telephone controller 140, thereafter video-coding the same (numeral 16 in FIG. 17) in the general H.263 or H.261 mode, storing the WWW contents of the HTML form downloaded from the Internet In in a packet box of T.120 (V.14, LAPM or the like) 17 for essentially transmitting an auxiliary device signal such as description data on a white board or the like and thereafter transmitting the same as H.324 signals along with a packet box of system control (H.245) 14 to the visual telephone terminals 125a and 125b through the public telephone lines 124. The composite data synthesizing circuit 139 may be a circuit formed in a hardware manner by combining semiconductor elements such as a transistor and a diode, or a software circuit operating by a prescribed software program in a CPU having a RAM and a ROM.

While the T.120 (V.14, LAPM or the like) 17 is essentially adapted to transmit a signal related to the white board or the like, communication can be made while defining a signal protocol of the H.324 mode without substantially changing the same by introducing data of the WWW contents of the HTML form into the T.120 (V.14, LAPM or the like) 17 and transmitting the same, so that compatibility with an existing electronic talking system can be kept in data form. The composite data synthesizing circuit 139 also has a function of transmitting signals of the H.324 mode received from the visual telephone terminals 125a and 125b to the host visual telephone controller 140.

The host visual telephone controller 140 has a function of transmitting the image acquired with the TV camera 121 and the voice obtained from the microphone in the TV camera 121 to the composite data synthesizing circuit 139 and a function of selecting the voice and the image from only one of the plurality of visual telephone terminals 125a and 125b by a switching operation in a prescribed switch part set in the visual telephone controller 140, transmitting the voice and the image and the WWW contents downloaded from the Internet In to the displays 135 and displaying the same on the prescribed areas 135a and 135b and outputting the voice.

The host visual telephone controller 140 and the composite data synthesizing circuit 139 are detachably connected with each other through a prescribed connection terminal such as a slot or a plug. Further, the host visual telephone controller 140 is detachably connected with the television sets (the displays 135 and the speakers 138) as well as the TV camera 121 through general video input/output terminals.

Figure 3:
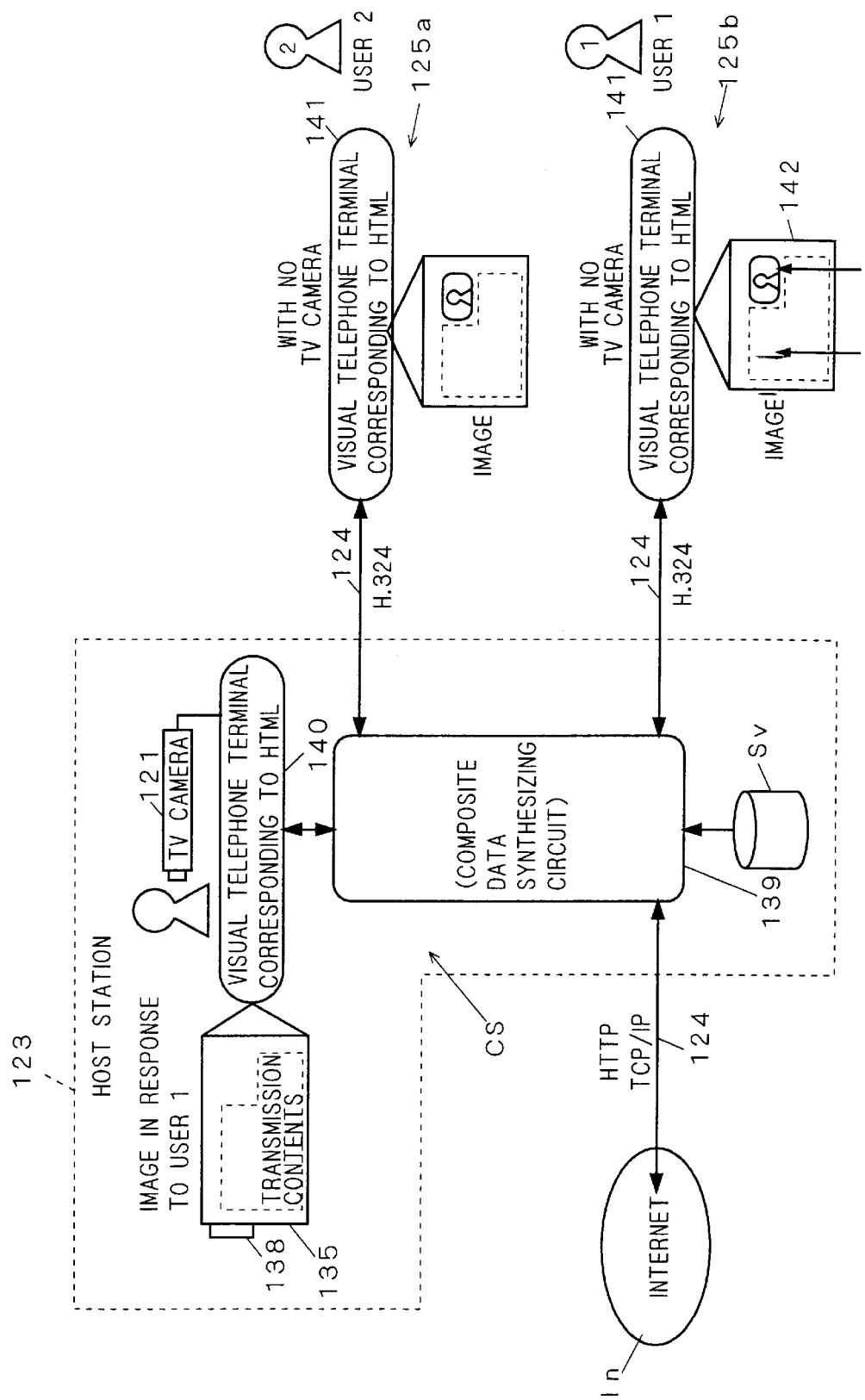
FIG. 3 is a block diagram showing another exemplary electronic talking system according to the first embodiment of the present invention.

Each visual telephone terminal 125a or 125b is set in a general home or a general office, consulting office or classroom, for example, remote from the Web contents transmission host base station 123, comprises a branch station visual telephone controller 141 (branch station control part) transmitting/receiving signals of the H.324 mode to/from the Web contents transmission host base station 123, and is detachably connected to a general television set 142 through a general connection cord provided with a video input terminal. When receiving a signal of the H.324 mode from the Web contents transmission host base station 123, the visual telephone terminal 125a or 125b image-edits image information and WWW contents in a constant layout and thereafter transmits the image signal and the voice signal after such edition to the general television set 142 for simultaneously reproducing•displaying the information (the voice and the image of the operator and the WWW contents) transmitted from the Web contents transmission host base station 123) on the television set 142 in multi-windows (see FIGS. 1 and 3). Referring to FIGS. 1 and 3, each numeral 142a denotes an area for displaying the image of the operator of the Web contents transmission host base station 123 and each numeral 142b denotes an area for displaying the WWW contents.

Each branch station visual telephone controller 141 is provided with a general video input terminal so that the voice signal and the image signal from the TV camera 143 storing a commercially available microphone (not shown) can be input as shown in FIG. 1 for performing voice coding (numeral 15 in FIG. 17) in the G723.1 mode in the H.324 mode and video coding (numeral 16 in FIG. 17) in the H.263 or H.261 mode when the voice signal and the image signal are input from the TV camera 143 and transmitting the same to the Web contents transmission host base station 123 as a signal of the H.324 mode along with the packet box of the system control (H.245) 14 through the public telephone line 124. In the electronic talking system according to this embodiment, however, the TV camera 143 may not necessarily be connected to each branch visual telephone controller 141 as shown in FIG. 3. In this case, the information related to the voice and the image from each visual telephone terminal 125a or 125b is not transmitted to the Web contents transmission host base station 123 but it follows that the Web contents transmission host base station 123 performs one-way information provision.

When the TV camera 143 is set on each visual telephone terminal 125a or 125b as shown in FIG. 1 in the electronic talking system having the aforementioned structure, the Web contents transmission host base station 123 and one branch (visual telephone terminal 125a or 125b) selected by the visual telephone controller 141 thereof mutually make visual telephone communication, while the Web contents transmission host base station 123 distributes the WWW contents downloaded from the Internet In to each visual telephone terminal 125a or 125b.

In other words, the Web contents transmission host base station 123 inputs the voice and the image of the operator in the TV camera 121 and transmits the same to the composite data synthesizing circuit 139 through the visual telephone controller 140 in the computerizing system CS.

In parallel with this, the Web contents transmission host base station 123 downloads the WWW contents from the Internet In and distributes the information to all visual telephone terminals 125a and 125b as signals of the H.324 mode through the public telephone lines 124. The Web contents transmission host base station 123 downloads the WWW contents from the Internet In through an operation similar to that performed in a general PC or the like by inputting an URL address or clicking a hyperlink part with an input unit such as a mouse for downloading character information or image information and storing (caching) the same in the server Sv.

Each visual telephone terminal 125a or 125b receives the H.324 mode signal distributed from the Web contents transmission host base station 123 in the branch station visual telephone controller 141, image-edits video information and the WWW contents in a constant layout, thereafter transmits an image signal and a voice signal after such edition to the general television set 142, and simultaneously reproduces•displays the information (the voice and the image of the operator and the WWW contents transmitted from the Web contents transmission host base station 123) on the prescribed areas 142a and 142b of the television set 142 in multi-windows.

Further, each branch visual telephone controller 141 inputs the voice and an image of the user 1 or 2 through the TV camera 143, performs voice coding (numeral 15 in FIG. 17) in the G.723.1 mode in the H.324 mode and video coding (numeral 16 in FIG. 17) in the H.263 or H.261 mode, generates a signal of the H.324 mode along with the packet box of the system control (H.245) 14, and transmits the signal to the Web contents transmission host base station 123 through the public telephone line 124.

When receiving signals from some visual telephone terminals 125a and 125b, the Web contents transmission host base station 123 selects one of them by performing switching in the switch part of the host visual telephone controller 140 for displaying an image on the area 135a of the display 135 and outputting the voice from the speaker 138. The Web contents transmission host base station 123 displays the WWW contents downloaded from the Internet In on the other area 135b of the display 135.

Thus, while making mutual communication between any visual telephone terminal 125a or 125b and the Web contents transmission host base station 123 with voices and images through visual telephones, WWW contents specified in the Web contents transmission host base station 123 can be simultaneously screen-displayed in both of the terminal 125a or 125b and the station 123. When performing management•employment consultation or a cramming school through communication between offices or between an office and a home, for example, a visual telephone call can be readily made while observing the same materials of WWW contents. In particular, talking and display of WWW contents can be performed through the general television set 142 without using the so-called PC, whereby the telephone call operation can be performed with a video feeling without employing an input unit such as a keyboard or a mouse accompanying the PC and operability can be kept simple.

When no TV camera 143 is connected to each branch visual telephone controller 141 as shown in FIG. 3, information related to the voice and the image from each visual telephone terminal 125a or 125b is not transmitted to the Web contents transmission host base station 123 but one-way information provision from the Web contents transmission host base station 123 can be readily performed by using the branch visual telephone controller 141 capable of bidirectional communication as such.

Second Embodiment

Figure 4:
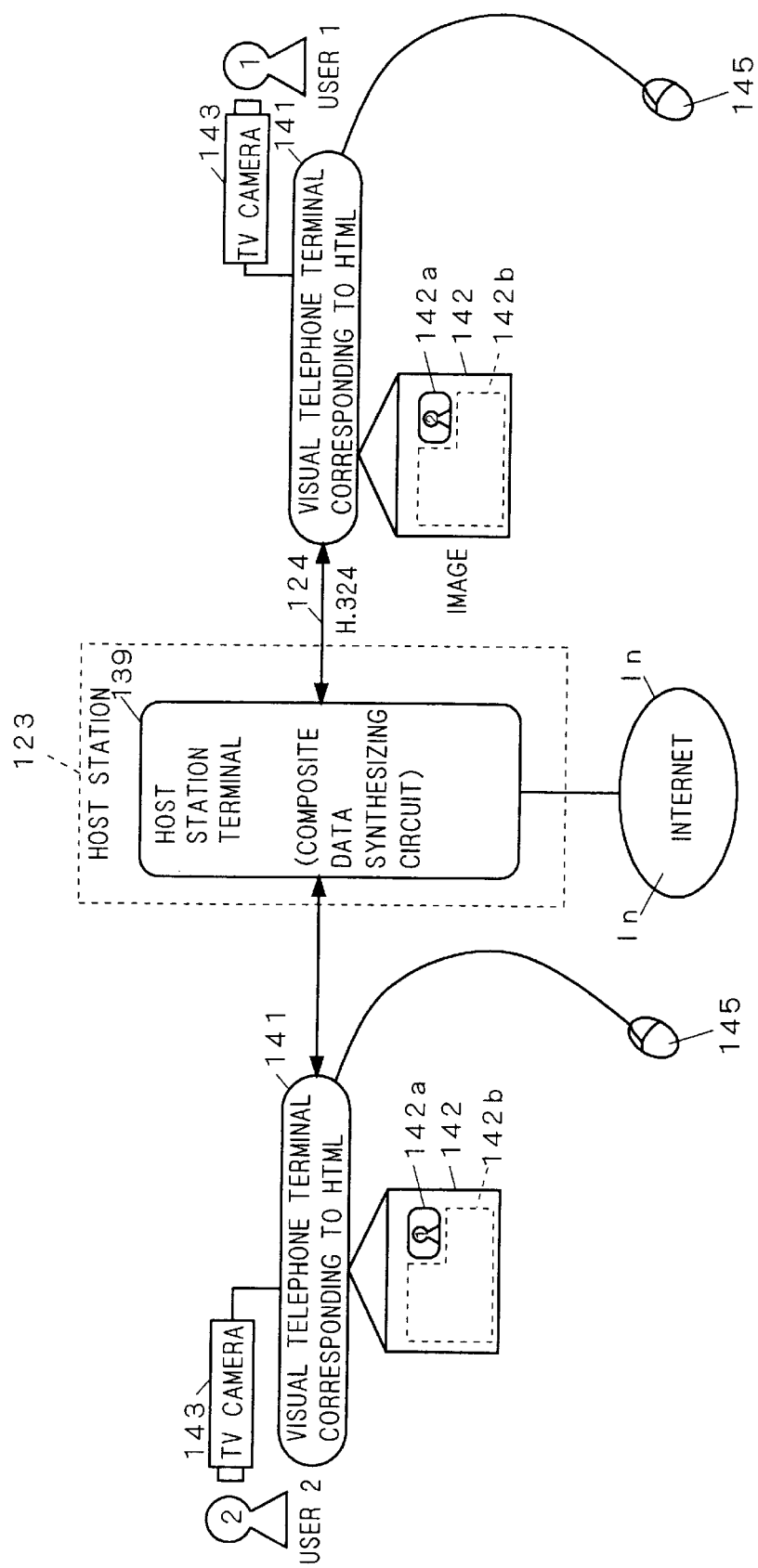
FIG. 4 is a block diagram showing an electronic talking system according to a second embodiment of the present invention.

FIG. 4 is a block diagram showing an electronic talking system according to the second embodiment of the present invention. Referring to FIG. 4, elements having similar functions to those in the first embodiment are denoted by the same reference numerals. As shown in FIG. 4, the electronic talking system according to th is embodiment can freely download character information, image information etc. of WWW contents by inputting an URL address related to the WWW contents or clicking a hyperlink part for the WWW contents through an input unit such as a mouse on the side of each visual telephone terminal 125a or 125b.

A branch station visual telephone controller 141 in each visual telephone terminal 125a or 125b is connected with a screen pointer input unit 145 (branch station input unit) such as a mouse, to be capable of freely accessing WWW contents on the Internet In by clicking a hyperlink part on a screen with the screen pointer input unit 145 in response to a desire of a user 1 or 2. Alternatively, WWW contents to be accessed may be specified by displaying a list of some URL addresses and selecting any address with the screen pointer input unit 145. Alternatively, a character input mode may be rendered settable on the screen with the screen pointer input unit 145 so that a URL address can be directly input by specifying/inputting characters with the screen pointer input unit 145 in this character input mode.

Each branch station visual telephone controller 141 stores a storage unit (not shown) of a prescribed capacity for storing (caching) the specified WWW contents therein.

The branch station visual telephone controller 141 transmits address information of the WWW contents specified by each user 1 or 2 to a Web contents transmission host base station 123.

The Web contents transmission host base station 123, basically similar in structure to the first embodiment, accesses and downloads WWW contents on the Internet In on the basis of the address information transmitted from the branch station visual telephone controller 141 in each visual telephone terminal 125a or 125b and individually distributes the WWW contents to each visual telephone terminal 125a or 125b. For simplifying illustration, FIG. 4 omits illustration of a TV camera 121, a host visual telephone controller 140, a display 135 and a server Sv, which are set in the Web contents transmission host base station 123 similarly to the first embodiment. Also in this embodiment, the Web contents transmission host base station 123 has such a function that an operator downloads desired WWW contents from the Internet In and distributes the same to each visual telephone terminal 125a or 125b, similarly to the first embodiment.

In the electronic talking system according to this embodiment, the Web contents transmission host base station 123 first distributes WWW contents selectively downloaded by the operator to each visual telephone terminal 125a or 125b. In parallel with this, a mutual visual telephone call is made between any visual telephone terminal 125a or 125b and the Web contents transmission host base station 123. Then, information of WWW contents and image information and voice information of the operator in the Web contents transmission host base station 123 are transmitted to the branch station visual telephone controller 141 in each visual telephone terminal 125a or 125b, to be displayed on prescribed areas 124a and 142b of a screen respectively and voice-output.

If the user 1 or 2 desires at this time, each visual telephone terminal 125a or 125b directly inputs a URL address by clicking a hyperlink part on the screen, selecting one of some URL addresses displayed on the screen or making switching to a character input mode by a prescribed operation and specifying/inputting characters with a screen pointer input unit 145 such as a mouse, for freely specifying address information of WWW contents on the Internet In in response to the desire of the user 1 or 2.

The specified address information is transmitted to the Web contents transmission host base station 123. The Web contents transmission host base station 123 accesses and downloads the WWW contents on the Internet In on the basis of the transmitted address information and individually distributes the WWW contents to each visual telephone terminal 125a or 125b.

Then, each visual telephone terminal 125a or 125b receives the WWW contents newly transmitted from the Web contents transmission host base station 123 in the branch station visual telephone controller 141 and displays the same on an area 142b of a television set 142. Thus, each user 1 or 2 can browse not only the WWW contents selected in the Web contents transmission host base station 123 but also the WWW contents selected in response to the desire of the user 1 or 2 and conveniently enjoy various WWW contents on the Internet In through the general television set 142.

If the user 1 or 2 is unfamiliar with the screen pointer input unit 145 such as a mouse, he can browse WWW contents previously selected in the Web contents transmission host base station 123. Thus, no excessive burden is applied to the user 1 or 2.

Third Embodiment

Figure 5:
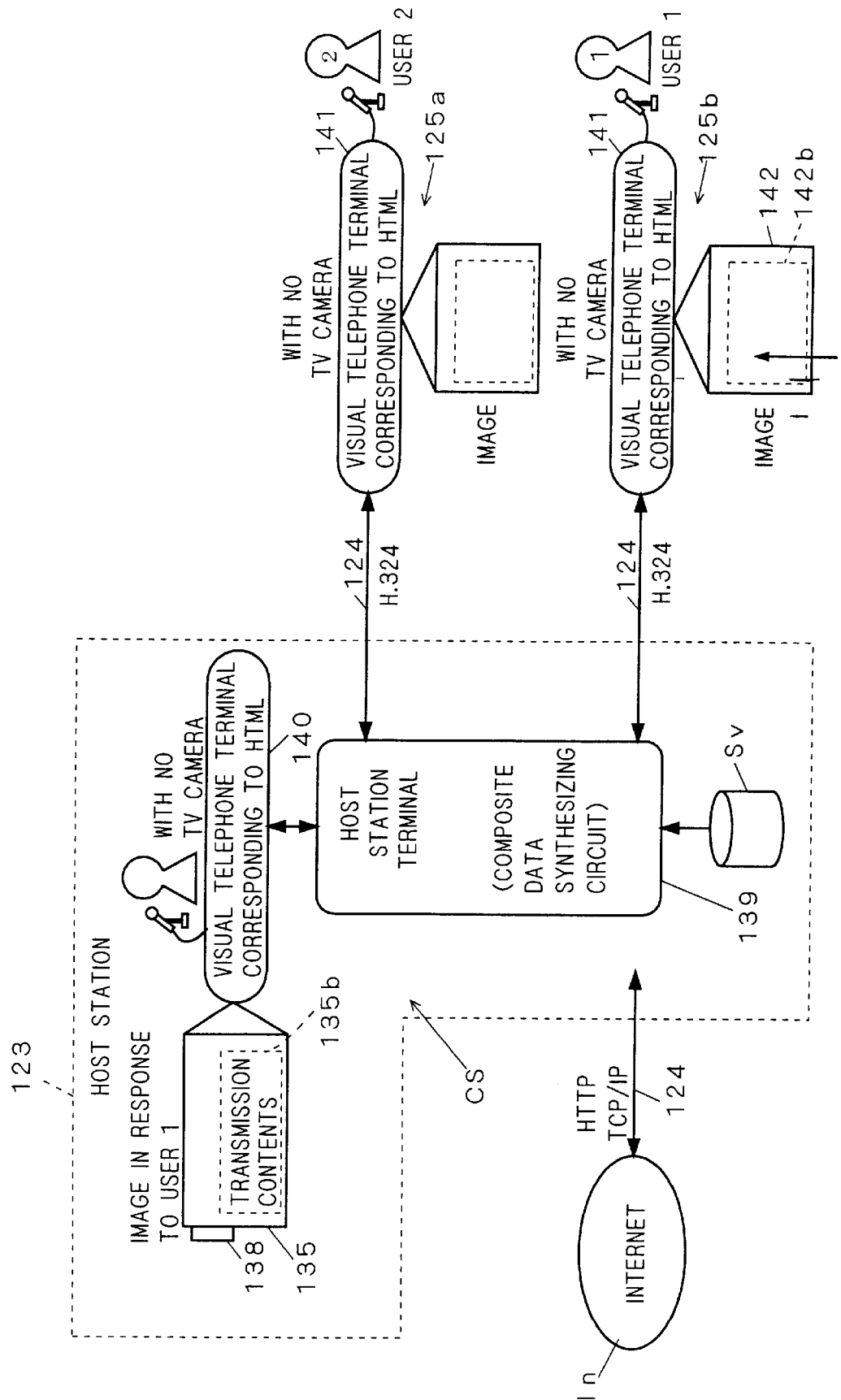
FIG. 5 is a block diagram showing an electronic talking system according to a third embodiment of the present invention.

FIG. 5 is a block diagram showing an electronic talking system according to the third embodiment of the present invention. Referring to FIG. 5, elements having similar functions as those in the first embodiment are denoted by the same reference numerals.

In the electronic talking system according to this embodiment, neither of a Web contents transmission host base station 123 and each electronic talking terminal 125a or 125b is provided with a TV camera but mutual communication is made by inputting voices through voice input microphones 151 and 152.

The Web contents transmission host base station 123 downloads WWW contents from the Internet In and distributes the same to each electronic talking terminal 125a or 125b, similarly to the first embodiment.

In the Web contents transmission host base station 123 and each electronic talking terminal 125a or 125b, screens displayed on a display 135 and a television set 142 have only areas displaying WWW contents. Voices are output through a speaker 138 in the display 135 and that in the television set 142.

The remaining structure of this embodiment is similar to that of the first embodiment.

In the electronic talking system according to this embodiment, voice communication on common WWW contents can be bidirectionally made between the Web contents transmission host base station 123 and each electronic talking terminal 125a or 125b while browsing the WWW contents.

Figure 6:
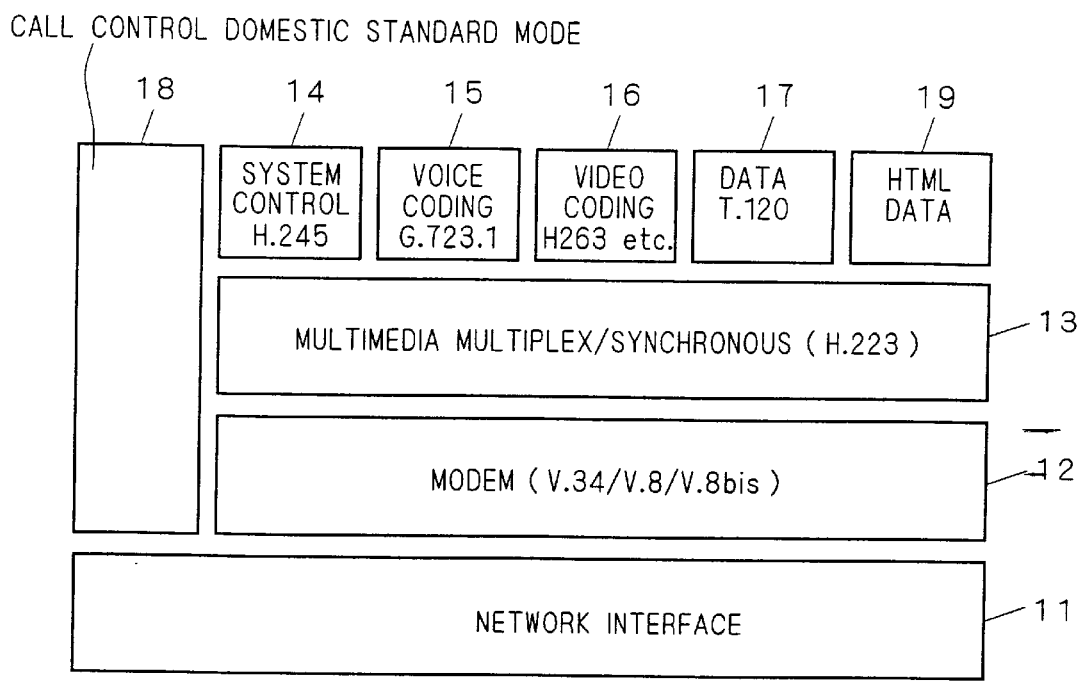
FIG. 6 illustrates a data format of an electronic talking system according to a modification.

While communication is made in the general visual conference standardization mode (H.324) in each of the aforementioned embodiments, communication can alternatively be made with a specific protocol other than the H.324 mode if communication compatibility with another system may not necessarily be taken into consideration in a specific cramming school or management guidance network. For example, WWW contents (HTML data) may be transmitted/ received while setting not T.120 data but another packet, as shown in FIG. 6.

While only WWW contents are described as information introduced into T.120 in each of the aforementioned embodiments, the Web contents transmission host base station 123 and each electronic talking terminal 125a or 125b may additionally interchange or transmit text data owned by the same, description image information of white boards or other various data, as a matter of course.

While the Web contents transmission host base station 123 and each electronic talking terminal 125a or 125b make communication through the general public telephone line 124 in each of the aforementioned embodiments, communication may alternatively be made through a dedicated line.

While a mouse is referred to as the screen pointer input unit 145 in the second embodiment, a keyboard, a remote control, a touch screen or a stylus pen may be used in place of or in addition to the mouse. Also in this case, WWW contents selected by the operator of the Web contents transmission host base station 123 can be distributed to each electronic talking terminal 125a and 125b and displayed on the television set 142 if the user 1 or 2 does not want to use the screen pointer input unit 145, and hence the screen pointer input unit 145 does not particularly trouble a person unfamiliar therewith.

While the display 135 of the host base station 123 is formed by a television set in each of the aforementioned embodiments, a display in a general computerizing system may be used in place thereof.

Fourth Embodiment

A fourth embodiment of the present invention is now described in relation to an information communication system convenient for a user in information interchange between a first station and a second station. The fourth embodiment includes an information communication system simultaneously utilizing a visual telephone system and the Internet similarly to the first to third embodiments, and is widely effectively applicable to the information communication field.

Outline of Fourth Embodiment

The outline of an information communication system 200 according to the fourth embodiment of the present invention is first described. Throughout the specification, "signal" expressing "information", "image", "voice", "text", "data" or the like is also described as "information", "image", "voice", "text", "data" or the like at need, in order to avoid complicated description. In relation to the quantity (signal quantity) of "signal", generally used expression "information quantity" or "data quantity" is also used.

Structure

Figure 7:
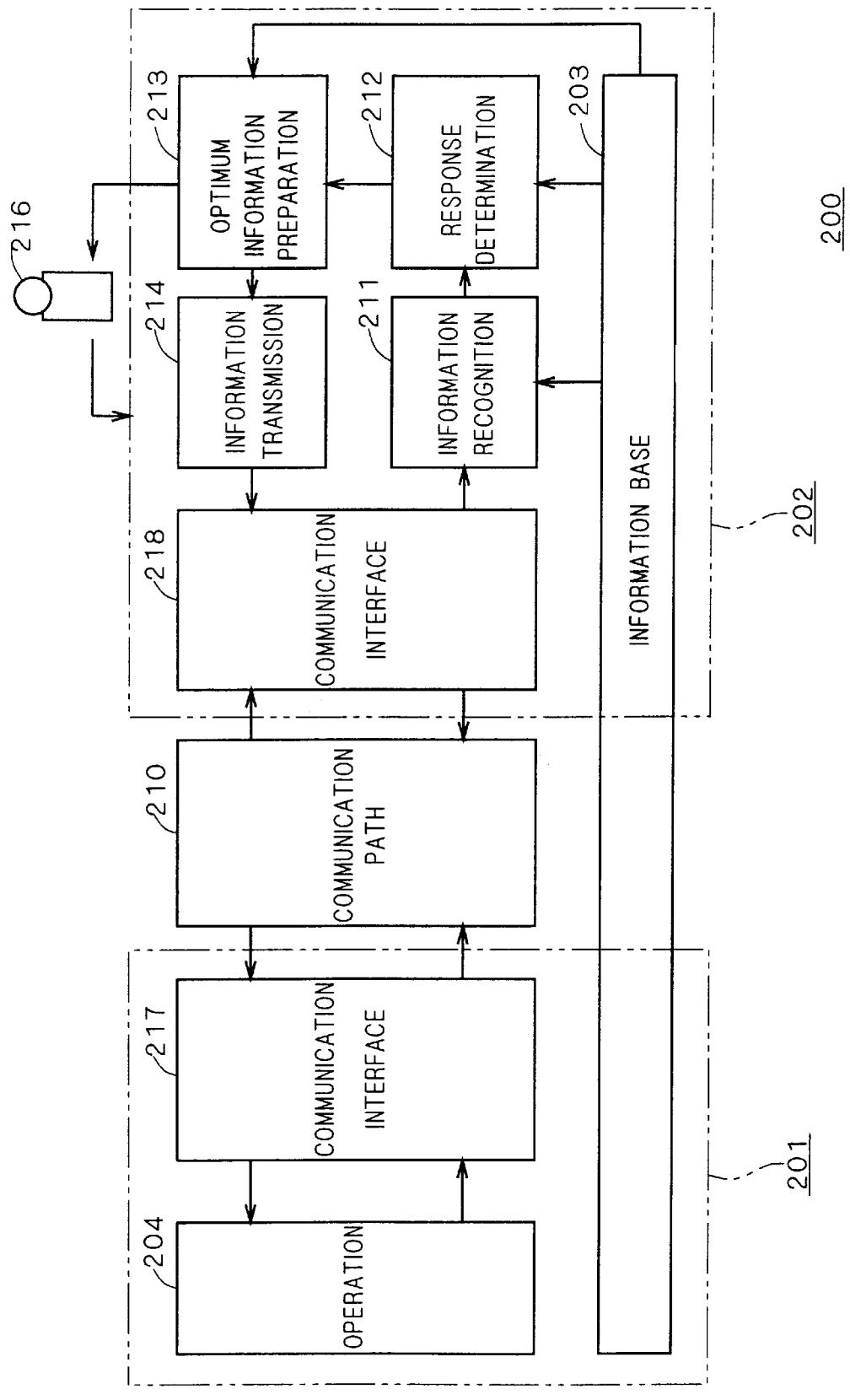
FIG. 7 is a block diagram showing the basic structure of an electronic talking system according to a fourth embodiment of the present invention.

FIG. 7 is a block diagram showing the information communication system 200 according to the fourth embodiment of the present invention. As shown in FIG. 7, the information communication system 200 for interchanging information between a plurality of first stations 201 and a second station 202 has an information base (information infrastructure; database) 203 including various types of information over the second station 202, each first station 201 and other stations, for recognizing the semantic contents of information transmitted from each first station 201 in the second station 202 preferably in response to each first station 201 with the information in the information base 203 while determining the optimum response on the basis of the result of the recognition, preparing various types of transmission information with the information in the information base 203 on the basis of the determination and transmitting the same to the first station 201. The first station 201 is a terminal unit set in each home, a prescribed bureau or the like, for example, and the second station 202 may be a host base station set in an information center managing prescribed information or the like, or a terminal unit set in each home or a prescribed bureau.

The information in the information base 203 includes every information such as personal information of a user using each first station 201, general mass information, information provided from a prescribed bureau and the like, and searches for information to be provided from the second station 202 to the user with not only a signal operated by the user but also various types of information in the information base 203 thereby preventing information retrieval from uniformalization.

The first station 201 in the information communication system 200 has an operation part 204 employing a man-machine interface with the user so that the user can operate/ input requirement for desired processing or desired information with the operation part 204.

The second station 202, interchanging information with the first station 201 through a prescribed communication path 210, recognizes the semantic contents of information transmitted from each first station 201 on the basis of the information in the information base 203 preferably in response to each first station 201 (information recognition part 211), determines the optimum response on the basis of the result of the determination (response determination part 212) while preparing information optimum for each first station 201 with the information in the information base 203 on the basis of the determination (optimum information preparation part 213), and transmits the prepared information through the communication path 210 (information transmission part 214).

The information base 203, storing various types of information, particularly includes prescribed attribute information of the user such as an identification number, gender, age, place of residence and hobbies and personal information storing a record of the types of information previously required by the user and a record of a search method selected when requiring the information.

When required by the user to provide various types of information, the second station 202 prepares the optimum information as transmission information, which includes information prepared by an operator 216 with various types of images and voices. When the optimum information is present in the information base 203, the corresponding information is transmitted to each first station 201. If information optimum for the response suitable to each first station 201 is absent in the information base 203, however, the second station 202 stops search for information and transmits the images, voices etc. of the operator 216 side to each first station 201. The images etc. on the operator 216 side may be the figure of the operator 216 acquired with an image pickup camera storing an image pickup device such as a CCD or conversation, or arbitrary information in the information base 203 selected by the operator 216. Alternatively, various types of information may be manipulated or converted in accordance with a prescribed procedure.

The communication path 210 used in this embodiment may use any medium such as the Internet utilizing a wide information communication network such as an analog public telephone line or ISDN, a communication satellite for CS data broadcasting, a specific communication network for CATV or the like, for example.

The information transmitted/received between the first station 201 and the second station 202 includes image information, voice information, character information and other various data or combination thereof.

The first station 201 and the second station 202 are provided with communication interfaces 217 and 218 connected to the communication path 210 for relaying information interchange between the stations 201 and 202 respectively.

Operation

Operations of the information communication system 200 having the aforementioned structure are now described. First, the user performs a prescribed operation through the operation part 204 for connecting the first station 201 to the communication path 210. Thus, the first station 201 enters a state capable of interchanging information with the second station 202 through the communication path 210. At this time, the user inputs prescribed information such as requirement for desired information from the operation part 204 and transmits the information to the second station 202 through the communication path 210. At this time, further, the user also transmits information in the information base 203 in the first station 201 to the second station 202.

The second station 202 recognizes the semantic contents of the information transmitted from each first station 201 on the basis of this information and the information in the information base 203 preferably in response to each first station 201 (information recognition part 211). The second station 204 determines the optimum response on the basis of the result of the recognition (response determination part 212). The second station 202 further prepares information optimum for each first station 201 with the information in the information base 203 (optimum information preparation part 213), and transmits the prepared information through the communication path 210 (information transmission part 214).

Thus, the second station 202 recognizes not only the information intentionally operated and transmitted by the user but also various types of information in the information base 203 such as the user's personal information and other information, for searching for the optimum information while making the optimum response on the basis thereof. Therefore, the second station 202 may not newly ask the user about information already obtained as that in the information base 203 but the user can reach desired information with a sense as if talking with a familiar operator 216, and the processing efficiency in the case of searching for information in an interactive response mode can be remarkably improved. Particularly when the second station 202 searches for information with the information in the information base 203 in addition to that consciously transmitted by the user for performing processing suitable for each user, the processing can be prevented from uniformalization.

Further, the information transmitted from the second station 202 to the first station 201 can be prepared by the operator 216 in a response form in addition to the information in the information base 203, whereby the number of such operators 216 can be minimized as compared with such a case that the operator 216 regularly necessarily responds in the interactive mode and it is possible to prevent a number of operators 216 from waiting.

While the information in the information base 203 is arranged over the first station 201, the second station 202 and other stations, the same may alternatively be set only in the first station 201, only in the second station 202 or only in other stations, or in a place of combination of any two of these stations.

More preferred modes of the processing parts forming the information communication system 200 shown in FIG. 7 are now described.

Information Base (Database)

Figure 8:
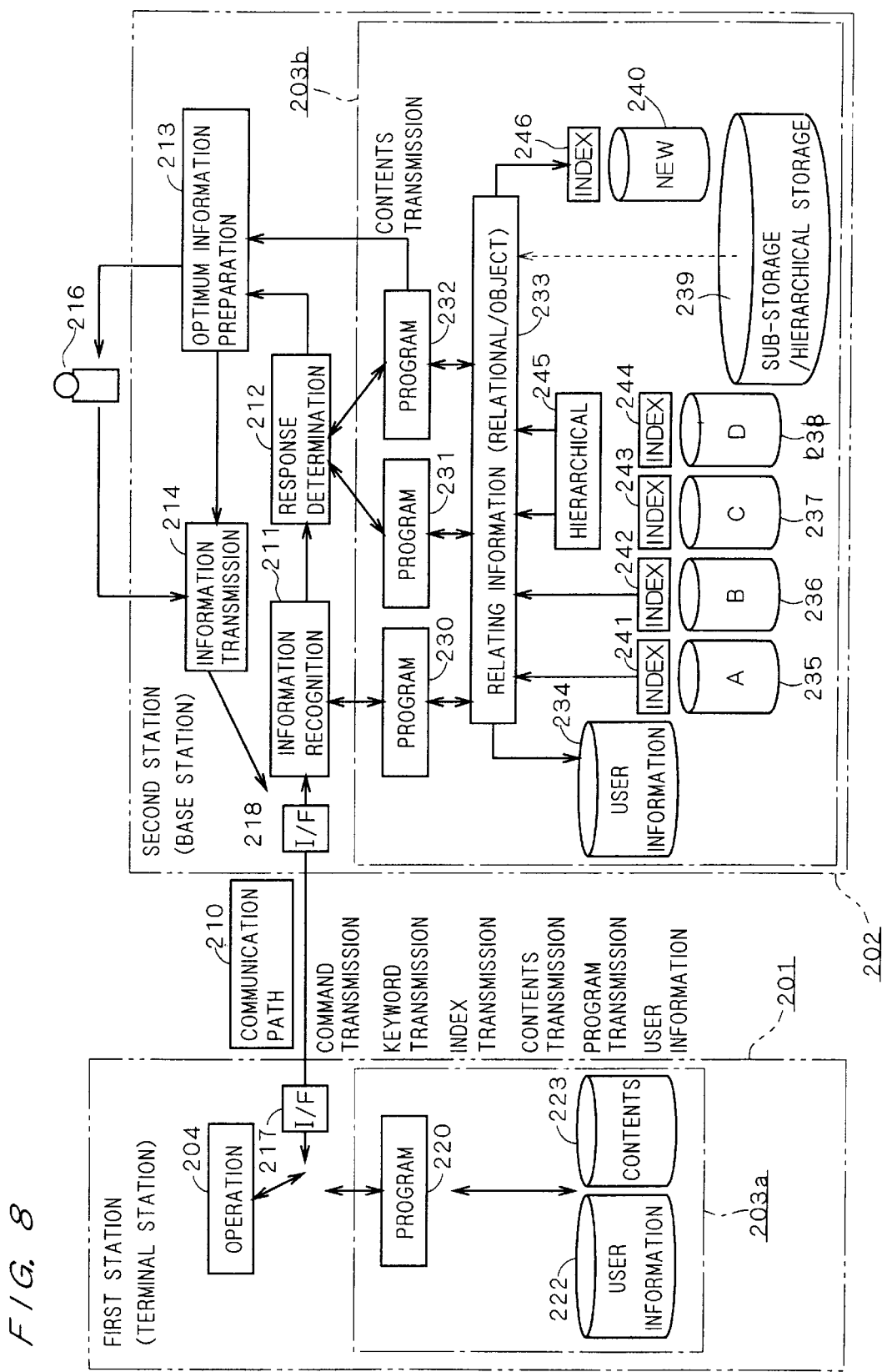
FIG. 8 is a block diagram showing an information base of a second station in the fourth embodiment of the present invention.

A preferred mode of the information base 203 is described with reference to FIG. 8.

In recent years, such an information base (the so-called database) is generally constructed in a peripheral storage unit of a computer or a PC (personal computer) following increase of the storage capacity thereof. The information communication system 200 preferably utilizes that constructed in such a mode as the information base 203. The storage unit is a medium (storage medium) such as an optical disk, a magnetic disk or a semiconductor memory, for example. Such a storage medium can read/write data in common through a plurality of applications.

As a data storage form, a general one such as a relational database in the form of a table or an object database integrating a procedure and data can be utilized. For example, each of the first stations 201 and the second station 202 can freely utilize a database present in a third station through the communication path 210 as if the database is part of that in the first or second station 201 or 202 with a technique such as that implementing bidirectional data transfer with agent software with the JAVA language, for example, developed for organically integrating and processing a plurality of databases dispersively present on a network by communication. The information base 203 means the whole of widely scattered individual information bases (i.e., dispersive databases) accessible through the network (communication path 210).

An information base (first station information base) 203a provided on the first station 201 as part of the information base 203 stores user information 222 and other information (contents) 223. Management such as input, retrieval and edition is performed for the information through a program 220. The information base 203a is connected to the operation part 204, and also connectable to the second station 202 through the communication interface 217 and the communication path 210.

An information base (second station information base) 203b provided on the second station 202 as another part of the information base 203 stores user information 234, various types of information (A to D in FIG. 8) 235 to 238, newly registered information 240 being newly stored and sub-storage/hierarchical storage information 239. Indices 241 to 246 are assigned to the information 234 to 240, and a hierarchical structure (example of a hierarchical index 245) may be employed for these indices 241 to 246. Management such as input, retrieval and edition is performed on the information 235 to 240 through programs 230 to 232. The programs 230 to 232 mange the information 235 to 240 with relating information 233. The information recognition part 211 and the response determination part 212 operate the programs 230 to 232.

Index

Figure 9:
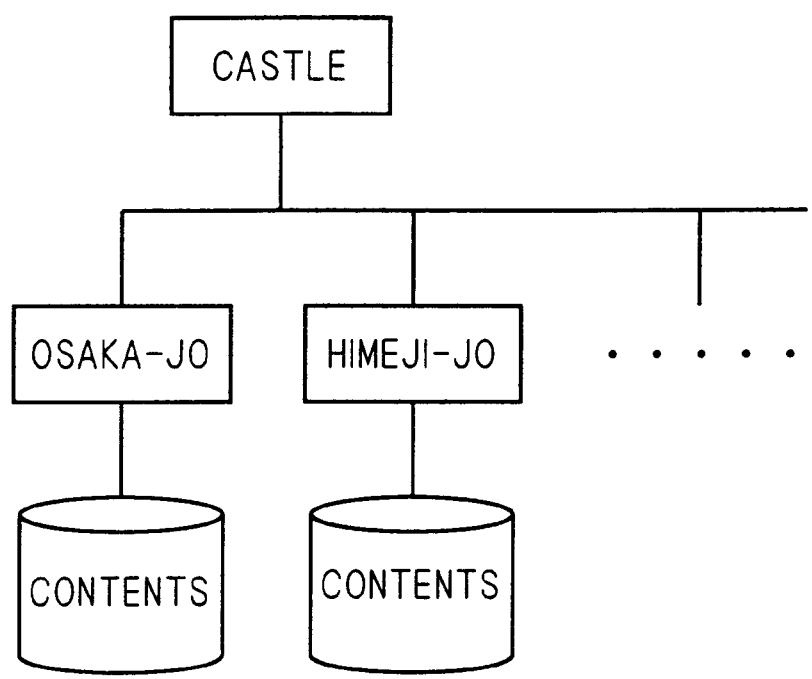
FIG. 9 is an operation explanatory diagram of the information base of the second station in the fourth embodiment of the present invention.

FIG. 9 is an explanatory diagram showing exemplary indices assigned to information. Referring to FIG. 9, the indices are assigned to various types of information (contents) related to "castle". For example, information assigned with "Osaka-Jo" includes the appearance of Osaka-Jo, a map showing the position thereof and the like as image information, an explanatory note related to the history of Osaka-Jo as character information, and a voice reading the explanatory note as voice information.

The indices, which are a kind of labels supplied to respective data, may be in the form of character data such as "castle", "Osaka-Jo" and "Himeji-Jo" as illustrated in FIG. 9, or in the form of numerical values such as "000", "001" and "002" or signs. The indices are automatically (with the programs 230 to 232) or manually (example of the index 246 in FIG. 8) assigned to the newly registered information 240 input through the communication path 210 or the like.

When requirement for information is received from the user of the first station 201, the response determination part 212 can read and return only an index in place of reading corresponding information. When the user requires information on "Osaka-Jo", for example, the response determination part 212 can return only the index thereof in place of returning information related to "Osaka-Jo" in FIG. 9. If the user can recognize the index, he can extract desired information from another database such as the information base 203a provided on his first station 201 or an information base, such as that prepared by a public library or the like for providing information free of charge, for example, provided on another terminal on the basis of the index. Since only the index is returned, the transmission quantity of information can be remarkably reduced as compared with the case of returning information and the communication cost for the user can be saved.

Hierarchical Index

The indices assigned to the information (contents) may have a hierarchical structure for reflecting the conceptual hierarchical structure of the information, as illustrated in FIG. 9. Referring to FIG. 9, the indices "Osaka-Jo", "Himeji-Jo", . . . are located as lower indices belonging to the upper index "castle". The hierarchical structure is not restricted to the two-layer structure illustrated in FIG. 9 but may have a plurality of layers in general.

When required by the user to provide information and retrieving information in the information base 203b with any index, the response determination part 212 can retrieve information corresponding to the closest index among hierarchical indices if the required information is absent.

If information on "Matsumoto-Jo" is required and no index therefor is present, for example, data of representative "Osaka-Jo" is substitutionally decided as the object of reading. When each index is in the form of a numerical value, the lowest value such as "001", for example, is assigned to representative information (e.g., "Osaka-Jo"). The optimum information preparation part 213 reads the information on the basis of the result of retrieval. Thus, representative information is returned to the user as substitutional information.

User Information

The information base 203b stores the user information 234. The user information 234 includes the access history of each user, personal information provided by the user etc. The information base 203a of the first station 201 also stores the access history, the personal information and the like as the user information 222.

A membership system may be employed for copying the user information 222 of the first station 201 to the information base 203b of the second station 202 as the user information 234 with the consent of the member possessing the first station 201. In this case, it is possible to provide service specific to the user such as transmission of a birthday message.

Sub-storage/Hierarchical Storage Information

The sub-storage/hierarchical storage information 239 includes data defining the relation between a plurality of information. The data may be data forming a kind of retrieval path between the plurality of information, data defining the hierarchical structure of the indices, or may include both data. When the user requires data of "Kyoto Gosho" and the data is absent, for example, the response determination part 212 can retrieve the information related to "castle" defined as relevant information. The response determination part 212 can further decide the information related to "Osaka-Jo" as representative information as the object of reading.

The sub-storage/hierarchical information 239 is created when the newly registered information 240 is input or the second station 202 is not busy in communication with another station (the second station 202 is free). The sub-storage/hierarchical information 239 can be automatically (with the programs 230 to 232) or manually created.

Operation Part

Figure 10:
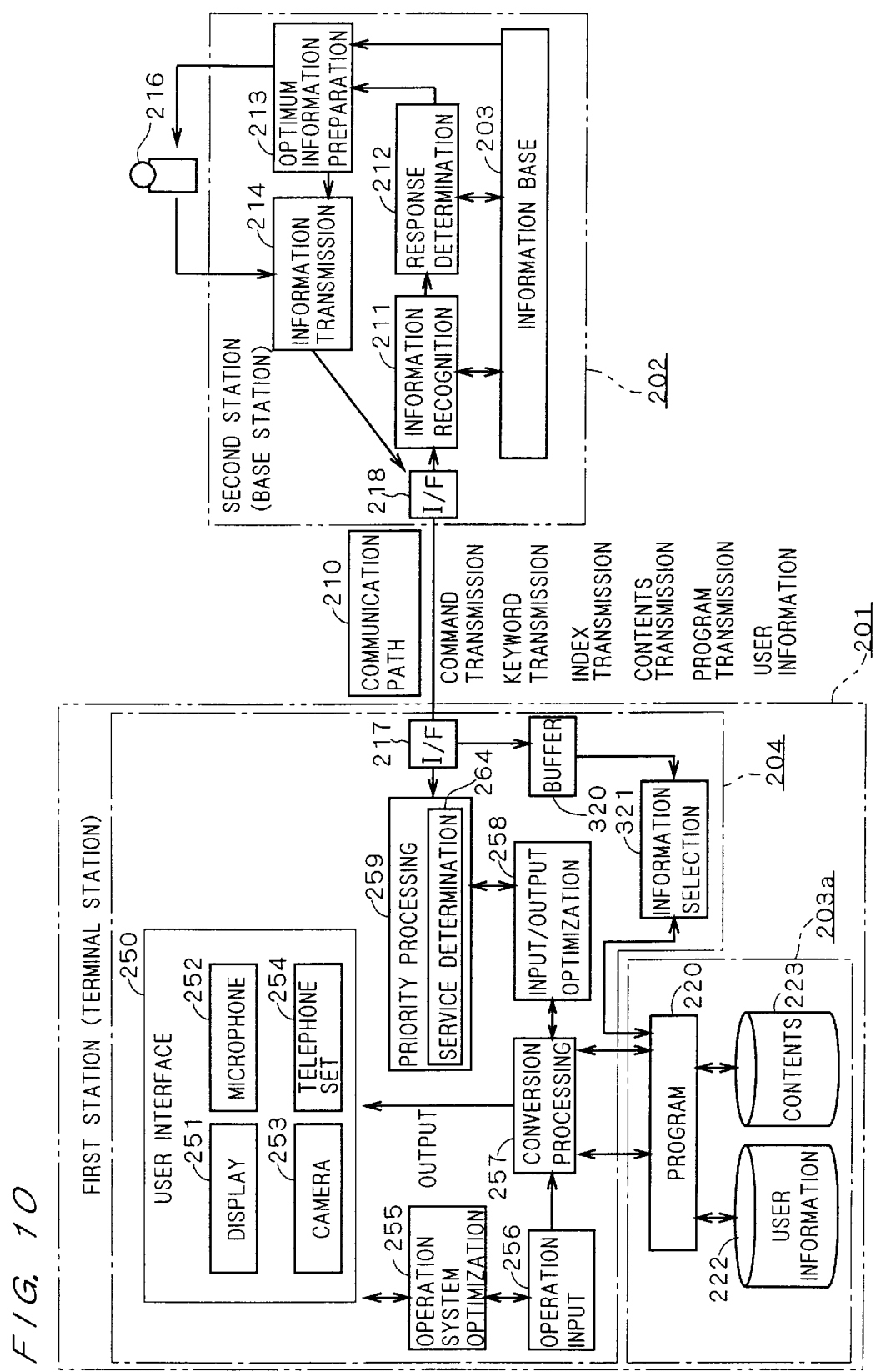
FIG. 10 is a block diagram of a first station in the fourth embodiment of the present invention.

A preferred mode of the operation part 204 is now described with reference to FIG. 10.

The operation part 204 includes a user interface 250, an operation system optimization part 255, an operation input part 256, a conversion processing part 257, an input/output optimization part 258 and a priority processing part 259. The user interface 250 includes communication media such as a display 251 displaying images, a microphone (hereinafter referred to as a mike) 252 collecting voices, a camera 253 acquiring images, a telephone set 254 and a scanner (not shown) reading the images.

The operation input part 256 includes input devices such as a keyboard for inputting characters etc, a pointing device represented by a mouse for inputting position information and a remote controller through infrared rays, to be directly touched by the user with hands or the like for inputting data. The user interface 250 and the operation input part 256 input information such as instructions by the user and output such as display of information.

Input/Output Optimization Part

The input/output optimization part 258 adjusts the information quantity (i.e., the quantity of signals expressing the information) in response to the forms of information such as image information, voice information and character information output from the various types of communication media provided on the user interface 250 as well as the state (transmission capacity and the degree of congestion) of the communication path 210. When a low-speed communication line is employed as the communication path 210 and the image information to be transmitted is a motion picture, for example, the input/output optimization part 258 performs processing for culling the screen (frames) and reducing the quantity of the information to be transmitted.

Priority Processing Part

The priority processing part 259 assigns priority to information to be transmitted and preferentially transmits information having higher priority to the communication path 210. When the first station 201 takes part in net auction, for example, the priority processing part 259 assigns the highest priority to information "purchase" and transmits this information prior to other information such as voice information or image information, in order to transmit the information "purchase" as soon as possible.

The priority is most simply set by the user operating the first station 201 at desire. More preferably, the priority is automatically decided in response to the type of the service provided by the second station 202. In general, the type of the provided service varies with the second station 202. The priority processing part 259 comprises a service determination part 264, which determines the type of the service.

The service determination part 264 determines the type of the service on the basis of words expressing the type of the service input through a keyboard or the like in keyword retrieval performed before the user selects the second station 202 as the counterpart of communication. Alternatively, the second station 202 may return a keyword to the first station 201 for each of a plurality of service provided by the same. In this case, the service determination part 264 determines the type of the service on the basis of the keyword.

Operation System Optimization Part

The operation system optimization part 255 can freely customize (optionally set) operation modes of the user interface 250 on the basis of the favor of the user (operator of the first station 201). Thus, labor of signal input for controlling the media can be reduced.

For example, it is possible to freely select (1) a synchronous operation mode in which the mike 252 and the camera 253 turn in association (i.e., such an operation mode that the camera 253 follows when the position of the mike 252 is changed), (2) such an operation mode that the sound collection direction of the mike 252 fluctuates following an auto focus operation of the camera 253, (3) an operation mode of cutting off transmission of image information when making a call with the telephone set 254, (4) an operation mode of reflecting an image of the user himself on the screen of the display 251, (5) such an operation that a call after 8:00 p.m. is put to only the user's room and the like by operating keys of the operation input part 256.

In particular, the operation system optimization part 255 has a macro control function of simultaneously controlling a plurality of media on the basis of a single key operation. The macro control function implements the aforementioned operation modes (1) and (2). Thus, the burden on the user for controlling the user interface 250 is further reduced.

Conversion Processing Part

The conversion processing part 257 selectively cuts off transmission or display of information by the plurality of media provided on the user interface 250 in response to operation of the operation input part 256 by the user or the type of the service (e.g., service for "English conversation") provided by the second station 202. For example, transmission of image information from the user to the counterpart of communication can be arbitrarily cut off in order protect privacy, for example. The conversion processing part 257 can also automatically turn on transmission of image information for only communication with a familiar friend, for example, with reference to the information stored in the information base 203a.

The conversion processing part 257 further can not only simply cut off a specific medium but also transmit another information in place of essential information transmitted by the specific medium. In place of transmitting the figure of the user acquired with the camera 253, for example, the conversion processing part 257 can turn off the camera 253 while reading a likeness or portrait of the user previously prepared in the information base 203a as the contents 223 and transmitting the same to the communication path 210.

Information Selection Part

The information base 203a of the first station 201 can also be employed as a storage node medium recording transmitted contents. When the second station 202 is a broadcasting station broadcasting its contents (TV programs or the like), for example, the information base 203a can be utilized as a recorder for the programs. When reserving recording of any program, the information selection part 321 recognizes specific information present in the contents of the program such as specific images, voices or keywords, for example, and automatically starts recording the program. If the user previously sets the name of a specific singer, the title of a specific news program or the name of a specific place, for example, the information selection part 321 simultaneously monitors the keywords of TV programs as continuously transmitted streaming contents over a plurality of channels and can retroactively record contents previously temporarily stored in a buffer memory (e.g., a frame memory) 320 when the keyword or the like is detected.

When indices are assigned to the contents sent from the second station 202, the information selection part 321 can also start recording reserved contents on the basis of the indices.

Communication Interface

Figure 11:
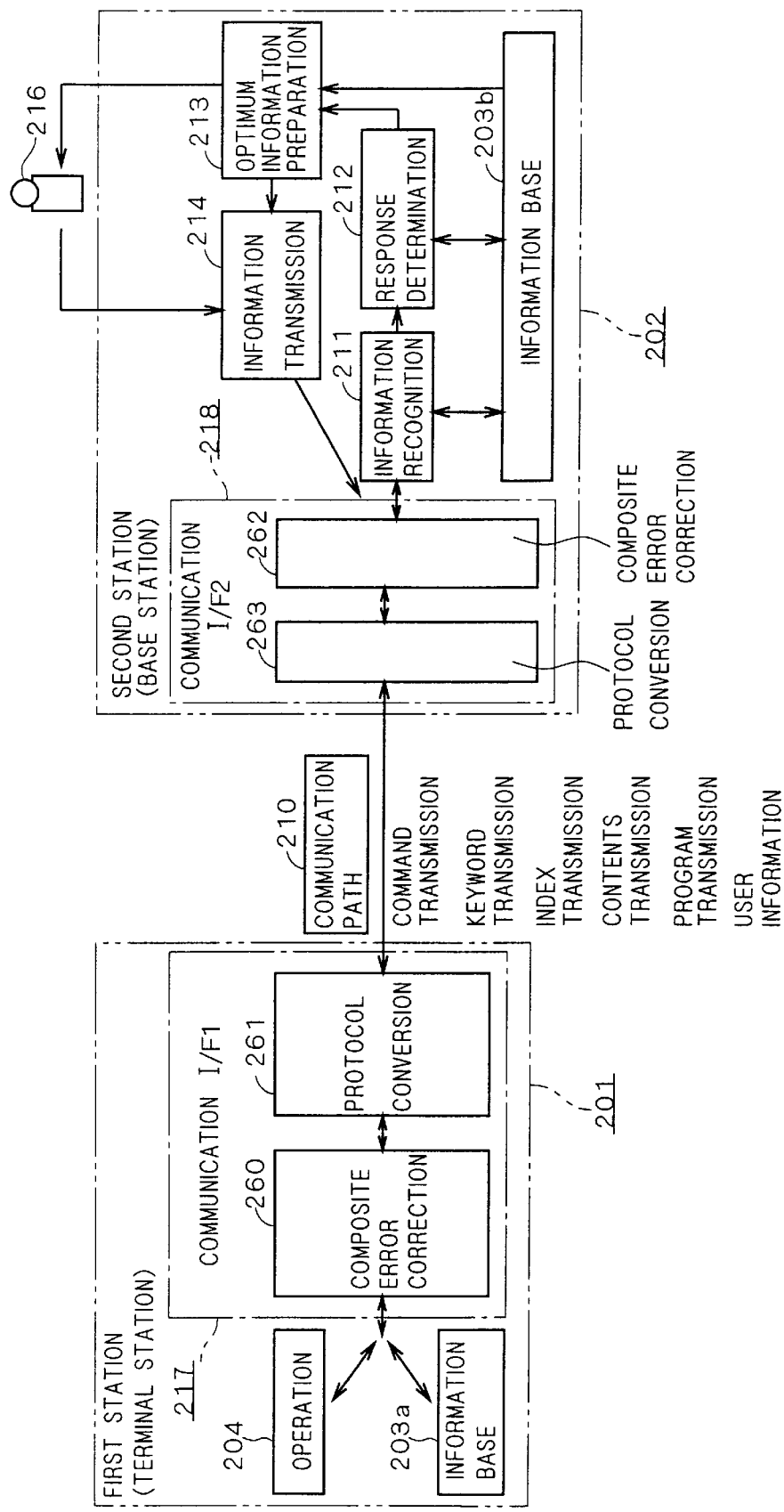
FIG. 11 is a block diagram of communication interfaces in the fourth embodiment of the present invention.

Preferred modes of the communication interfaces 217 and 218 are now described with reference to FIG. 11.

The communication interfaces 217 and 218 are located on inlets/outlets of information for the first station 201 and the second station 202 with respect to the communication path 210 respectively and connected to ends of the communication path 210. Thus, the communication interfaces 217 and 218 enable the first station 201 and the second station 202 to mutually transfer various forms of information such as images, voices, characters and data through a network such as the Internet or a local area network (LAN) as the communication path 210.

A well-known transmission medium such as a general public telephone line, a high-speed line such as ISDN or ADSL/XDSL, a wire for CATV or the like, data broadcasting (radio waves) with a satellite (CS) and surface wave digital TV, a wireless communication path in the SS mode or the like can be utilized as a transmission medium forming the communication path 210. A communication system using the Internet employing a general protocol such as TCP/IP on such an infrastructure known as a mainstream communication system at present may also be utilized as the communication path 210.

Preferably, the communication interface 217 includes a composite error correction part 260 and a protocol conversion part 261, and the communication interface 218 similarly includes a composite error correction part 262 and a protocol conversion part 263.

Protocol Conversion Part

As to protocol conversion applied in this embodiment, a mode including an information communication system simultaneously utilizing a visual telephone system and the Internet widely effectively employed in the information communication field is used similarly to the first to third embodiments.

In general, it has been impossible to simultaneously make communication with visual telephones and that employing the Internet through a single telephone line. In order to simultaneously make these two modes of communication, therefore, the ISDN having 2B lines or the like has been utilized.

The Internet In is a worldwide computer network formed by some basic networks with application of a communication protocol (communication connection means) of the TCP/IP (Transmission Control Protocol/Internet Protocol) mode capable of connecting different types of machines. Servers (mass storages) serving as communication nodes on a number of service providers (ISP: Internet service providers) respectively store various WWW contents and the like so that the same can be browsed through a terminal such as a PC connected to the Internet In. The WWW contents, which are generally referred to as home pages, can be displayed on the display of a PC or the like in a language described in the HTML (Hypertext Markup Language) form with a browsing software program referred to as a browser.

Each of the protocol conversion parts 261 and 263 simultaneously implements visual telephone communication and Internet communication while employing only a single telephone line as the communication path 210. In transmission, therefore, each of the protocol conversion parts 261 and 263 superposes HTML data on a blank area included in the H.324 protocol (standard related to visual telephone communication by an international organ) for visual telephone communication and transmits the superposed data to the communication path 210. In receiving, further, each of the protocol conversion parts 261 and 263 decomposes and takes out superposed data.

More specifically, each of the protocol conversion parts 261 and 263 voice-codes voice information collected by the mike 251 etc. in the general G.723.1 mode, video-codes image information acquired by the camera 253 in the general H.263 or H.261 mode, stores WWW contents (stored in the information base 203a as part of the contents 223, for example) of the HTML form downloaded through the Internet in the packet box of T.120 (V.14, LAPM or the like) which is a blank area, and thereafter transmits the same to the single public telephone line forming the communication path 210 as a signal of the H.324 mode along with a packet box of system control (H.245).

While the T.120 (V.14, LAPM or the like) is essentially prepared for transmitting a signal for an auxiliary device such as description data on a white board or the like, communication can be made while protocol-defining a signal protocol of the H.324 mode without substantially changing the same by introducing data of the WWW contents of the HTML form into the T.120 (V.14, LAPM or the like) and transmitting the same, so that compatibility with an existing visual telephone system can be kept in data form.

Each of the protocol conversion parts 261 and 263 extracts image information, voice information and WWW contents from data based on the H.324 protocol received through the single public telephone line forming the communication path 210, image-edits the image information and the WWW contents in a constant layout, adds voice information to the edited image information and transfers the same to the display 251, for example. Thus, the display 251 (assumed to have a speaker) reproduces the voice of the operator 216 of the second station 202, for example, and simultaneously displays the image of the operator 216 and the WWW contents in parallel on prescribed areas of the screen in the form of multi-windows.

The H.324 protocol may be replaced with another protocol for visual telephone communication similarly having a blank area.

Composite Error Correction Part

In the communication path 210, a defect (error) may originate in the information signal transmitted through the communication path 210 due to noise or depending on the line condition. The composite error correction parts 261 and 262 set an allowable failure range for each of the contents such as commands, data, texts, voices and images and allocate a plurality of error correction functions to each content in response to the situation of the communication path 210, thereby implementing efficient communication.

Each of the composite error correction parts 261 and 262 first detects an error as to received signals. When any error is detected, each composition error correction part 261 or 262 selectively executes one of four types of processing for (1) correcting the error, (2) requiring the sending end to retransmit the signal, (3) making no correction and (4) manipulating the received signal. The error correction part 261 or 262 individually selects one of the four types of processing in response to which one of a plurality of types such as an image, a voice, a command, data and a text the received signal belongs to.

For example, the composite error correction part 261 or 262 executes the processing (1) or (2) for an error in a command, data or a text thereby correcting the error. As to data strictly requiring correctness such as data received in communication service through a credit card, for example, the composite error correction part 261 or 262 repeats requirement for retransmission (the processing (2)) until no error is found in the received signal. As to the type of the data, the result of the determination of the aforementioned service determination part 264 may be referred to, for example.

As to the voice, the composite error correction part 261 or 262 performs processing of eliminating an abnormal signal (processing (4)) when the abnormal signal is superposed, for example, to protect the speaker against breakage. As to the image, requirement for retransmission or error correction is minimized and the received signal generally passes through the composite error correction part 261 or 262 in an uncorrected state (processing (3)).

If any of the aforementioned four types of processing (1) to (4) is uniformly performed on all of a plurality of received information, the efficiency is deteriorated. However, the composite error correction part 261 or 262 selectively executes the processing (1) to (4) in response to the form of the received signal and hence the processing efficiency is improved.

Information Recognition Part

Figure 12:
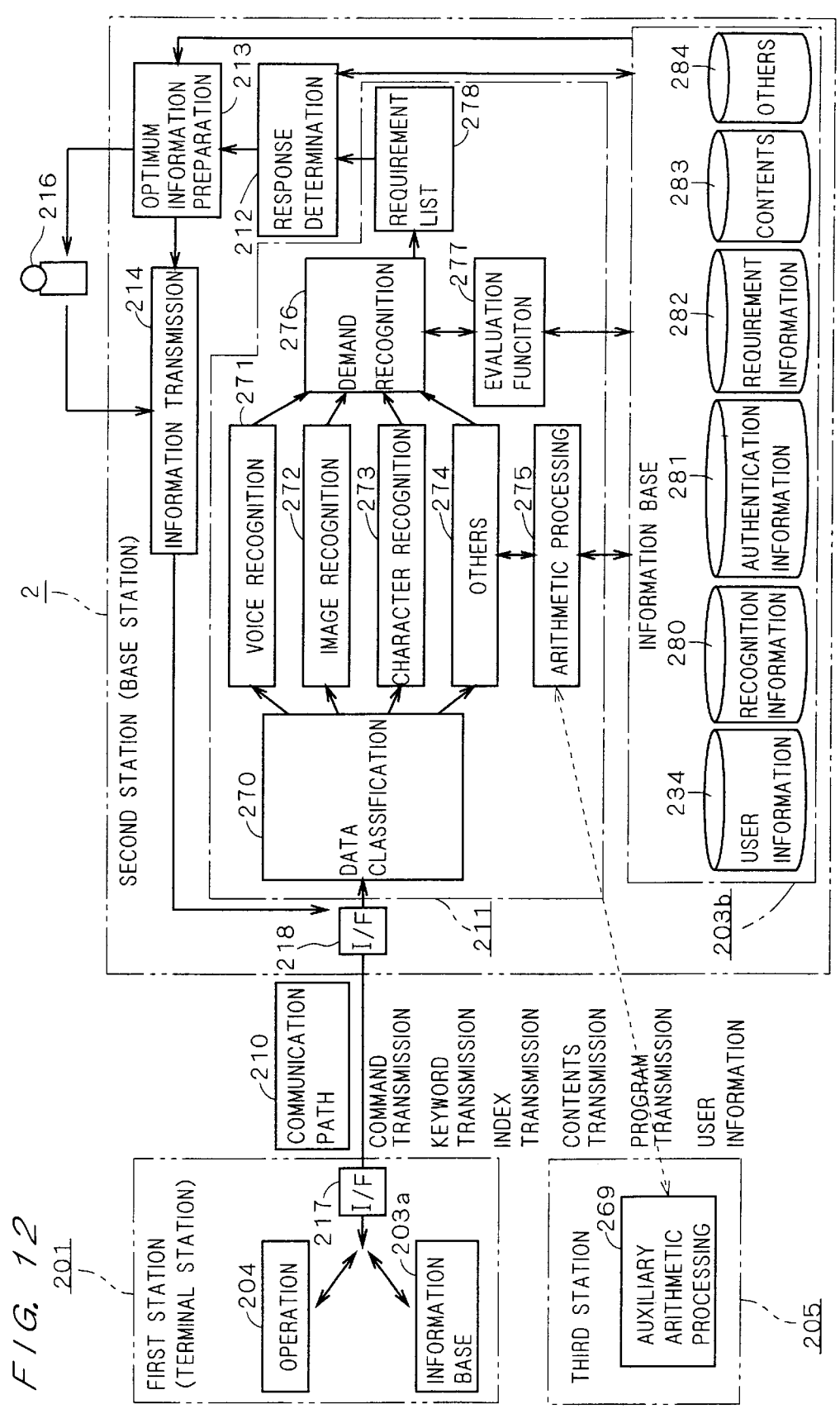
FIG. 12 is a block diagram of an information recognition part in the fourth embodiment of the present invention.

A preferred mode of the information recognition part 211 is now described with reference to FIG. 12.

The information recognition part 211 preferably includes a data classification part 270, a voice recognition part 271, an image recognition part 272, a character recognition part 273, an information recognition part 274 for others, an arithmetic processing part 275, a demand recognition part 276 and an evaluation function part 277.

Basic Operation from Data Classification to Demand Recognition

The data classification part 270 classifies received signals input through the communication interface 218 in response to the forms thereof and individually inputs the same in the recognition parts 271 to 274. In other words, the data classification part 270 transmits voices, images and characters included in the received signals to the voice recognition part 271, the image recognition part 272 and the character recognition part 273 respectively. Thus, the received signals including a plurality of forms of signals are automatically subjected to recognition (i.e., feature extraction).

A well-known technique is employable for each of the recognition parts 271 to 274. While the conventional information recognition technique is based on an operation of converting information input/generated by an operator or a system of another station to a form understandable by a computer system or the like by retrieving a dictionary database or the like, a technique capable of recognizing and converting signals as information having higher degrees of semantic contents by performing various types of arithmetic processing on the signals such as image and voice signals in the form of digital signals is recently developed. For example, an image recognition technique of extracting the contour of a person from an image signal or extracting a moving part from a motion picture, a voice recognition technique of detecting that matching with a pattern in a database from a voice signal and operating a system, a character recognition technique determining a character, a word, handwriting or the like from a handwritten character and the like are known.

These information recognition techniques are based on an information theory. In voice recognition, for example, a voice signal digitized by A–D conversion is converted to a vector expressing the feature of a spectrum. At this time, a method such as cepstrum conversion performing inverse Fourier transform on a spectrum of a logarithm is employed. Then, phoneme recognition of selecting the closest one from speech segments forming the minimum units corresponding to the alphabetic characters or the Japanese syllabary is performed. A technique of performing phoneme recognition by employing a technique referred to as "hidden Markov model" is known particularly in recent years. A result obtained in phoneme recognition is compared with words in a dictionary of the database so that a proper word is selected and output as a recognition result.

Each of the recognition parts 271 to 274 refers to recognition information 280 included in the information base 203b, thereby executing required recognition processing. The database as referred to may be not only the information base 203b provided on the second station 202 but also the information base 203a provided on the first station 201 or an information base provided on another terminal connectable through the network. The certainty of voice or image recognition is improved by making determination and selection through the database for the user (i.e., a database for a specific talker) already stored in each first station 201 by the user rather than through a database for recognition by an unspecified talker.

The demand recognition part 276 recognizes the user's demand (required contents) on the basis of the results of recognition in these recognition parts 271 to 274. Therefore, the user can send the demand to the second station 202 by transmitting a voice, an image or a handwritten character without inputting characters through a keyboard or the like. The recognized demand is transmitted to the response determination part 212 as a requirement list 278, so that the second station 202 thereafter executes processing responsive to the demand.

Authentication

The voice recognition part 271 is preferably utilized not only for recognition of the language expressed in the voice but also for authentication of the talker (user operating the first station 201). Whether or not the user connected to the network is the right person is generally authenticated by checking an input password or the like. On the other hand, the voice recognition part 271 extracts the features (e.g., the accent, the voice quality, the voiceprint etc.) of the voice and transmits the same to the demand recognition part 276. The evaluation function part 277 reads authentication information 281 included in the information base 203b and collates the same with the features of the voice transmitted to the demand recognition part 276. Thus, whether or not the talker is the right person is determined (i.e., authentication is performed). Thus, authentication is performed when the talker simply says "hello".

The result of authentication is transmitted to the demand recognition part 276.

The demand recognition part 276 transmits not only the demand but also the result of authentication as the requirement list 278. When such a result of authentication is obtained that the talker is not the right person, the result of authentication is returned to the first station 201 and subsequent communication with the first station 201 is cut off, for example, through processing by the response determination part 212 and others.

In place of or simultaneously with voice recognition, image recognition may also be employed for authentication of the talker. At this time, the image recognition part 272 extracts the features of the talker's face. The evaluation function part 277 refers to the authentication information 281 for collating the features of the face along with those of the voice, for example, thereby performing authentication.

Inference of Requirement

The demand recognition part 276 preferably not only recognizes the user's demand (required contents) as transmitted by the user (as expressed in the voice, for example) but also infers more detailed contents (true intention) not transmitted (e.g., not directly expressed in words). When the user's demand is "to obtain information related to eyeglasses", for example, characters or a voice transmitting the required contents is recognized through the character recognition part 273 or the voice recognition part 271, for example, so that the demand recognition part 276 recognizes the directly expressed demand.

The evaluation function part 277 refers to the user information 234 thereby picking up information that "this user purchased eyeglasses five years ago" and infers that "the user hopes to purchase new eyeglasses" on the basis of this information and the directly expressed demand. The inference can be made with a well-known inference technique. The result of the inference is transmitted to the demand recognition part 276. Since the user requires "information related to eyeglasses", the evaluation function part 277 further refers requirement information 282 included in the information base 203b thereby inferring that the user requires "information related to eyeglasses suiting his face". The result is transmitted to the demand recognition part 276.

Consequently, the demand recognition part 276 transmits a final demand to which the inference that "the user requires information related to eyeglasses suiting his face for re-purchasing" to the response determination part 212. Thus, processing of searching for unexpressed contents of the user's true requirement in user's place is performed by referring to the database in addition to the contents of the requirement directly transmitted by the user.

When the contents of the requirement are "the user requires information related to eyeglasses suiting his face for re-purchasing", the image recognition part 272 is employed not only for authentication but also for recognition of the contents of the user's requirement. In other words, the image recognition part 272 analyzes an image of the user's face and extracts the features thereof. The extracted data (e.g., the shape, the width and the color of the face) are transmitted to the response determination part 212 along with the requirement list 278. The demand recognition part 276 further extracts personal data related to the user's age, gender etc. from the user information 234 and transmits the same to the response determination part 212. As described later, the response determination part 212 retrieves eyeglasses suitable to the features of the user's face and other features such as the user's age and gender from contents 283 included in the information base 203b, for example. Consequently, information responsive to the inferred demand is returned to the user.

Utilization of External Terminal

The arithmetic processing part 275 assists the recognition processing in the recognition parts 271 to 274. When the character recognition part 273 recognizes characters, for example, translation between different languages (e.g., translation from English to Japanese) is performed. Other information 284 of the information base 203b stores a dictionary for translation so that translation is executed with reference to the dictionary.

When the scale of the second station 202 is restricted in relation to the memory capacity, the processing speed, the contents of the database and the like, the arithmetic processing part 275 preferably utilizes an arithmetic processing part 269 of an external terminal (third station) 205 connected to the network as an auxiliary arithmetic processing part. The arithmetic processing part 269 of the third station 205 having a high speed with allowance in throughput is utilized through a program such as JAVA, for example. At this time, an information base of the third station 205 may be simultaneously utilized. Thus, when the user is a foreigner, for example, translation can be entirely left to a foreign terminal. Thus, a higher degree of translation can be performed.

The above may be performed when the second station 202 has low arithmetic throughput, is in the process of executing another processing having high importance or cannot have a sufficient database due to restriction of the storage capacity, for example. The arithmetic processing part 275 may utilize only the information base without utilizing the auxiliary arithmetic processing part 269 in the third station 205.

Response Determination Part

Figure 13:
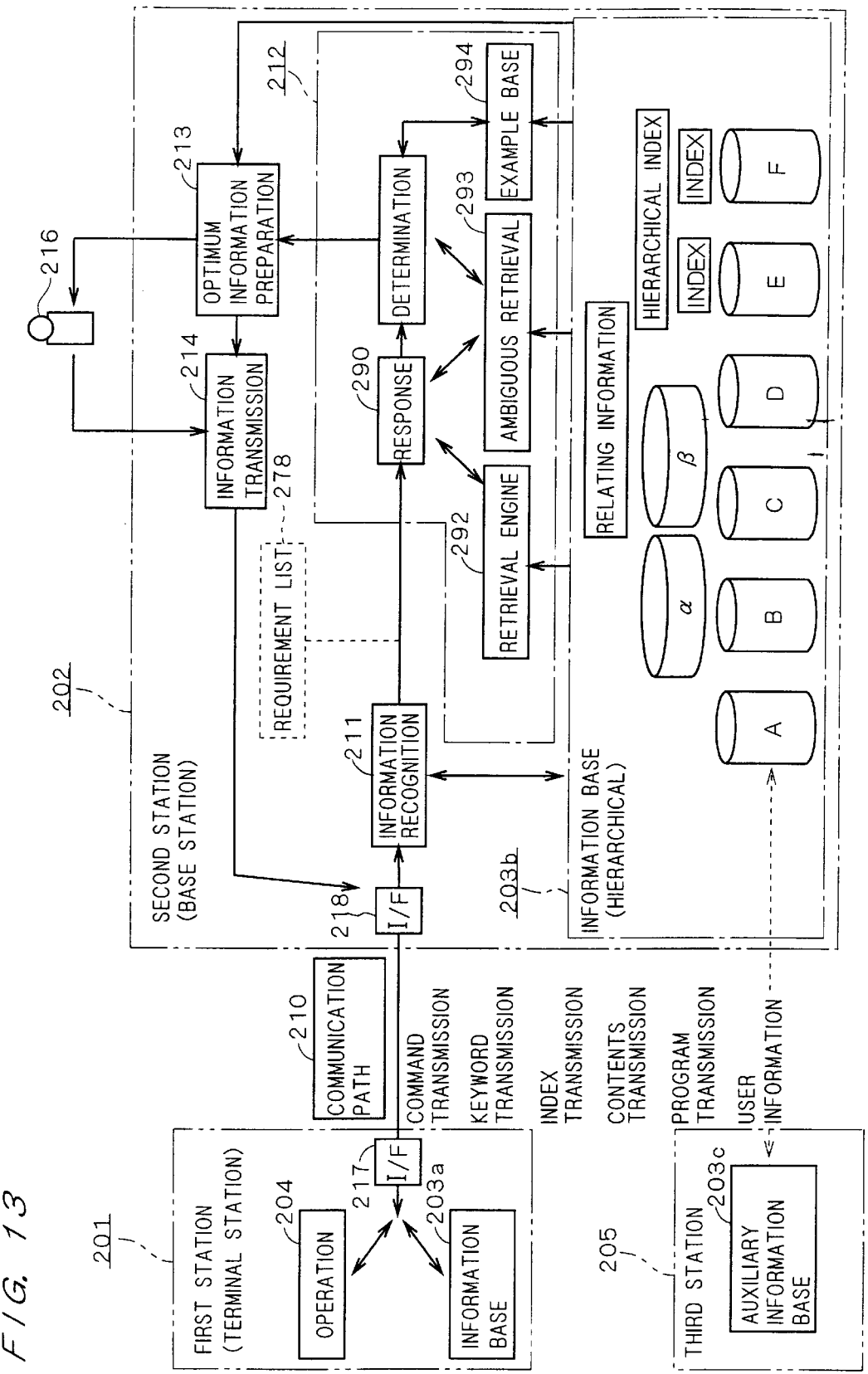
FIG. 13 is a block diagram of a response determination part in the fourth embodiment of the present invention.

A preferred mode of the response determination part 212 is now described with reference to FIG. 13.

The response determination part 212 makes retrieval of the information base 203 (not limited to the information base 203b) on the basis of the user's demand expressed by the requirement list 278 transmitted from the information recognition part 211. When performing retrieval, the response determination part 212 may make response determination with a general database management system (DBMS) described in an SQL language or the like, or may retrieve a past example most matching with new information from the database by utilizing the recent "example base inference" technique for obtaining a solution by reusing the same while employing a neural network thereby improving the efficiency of the retrieval of the optimum example and response determination, processing of additional learning contents and the like.

Alternatively, matching with contents or a keyword previously registered in the database may be made by natural language input through a recent robot retrieval engine agent technique. Thus obtained is such an advantage that a conditional expression or the like may not be correctly described. The result of the retrieval is transmitted to the optimum information preparation part 213, which in turn prepares optimum information through the information of the information base 203 on the basis of the result of retrieval and returns the same to the first station 201 through the information transmission part 214.

In order to implement the aforementioned operations, the response determination part 212 includes a response part 290, a determination part 297, a retrieval engine 292, an ambiguous retrieval part 293 and an example base part 294.

Retrieval Engine

The retrieval engine 292 makes retrieval on the basis of a keyword or an index. When retrieving an information group provided with hierarchical indices on the basis of the index, how deep and wide to make retrieval on the hierarchy is determined in consideration of efficiency such as the cost, the speed and the like. When a number of data, e.g., 10,000 data belong to the corresponding index, the determination part 291 transmits an instruction to the optimum information preparation part 213, for example, to temporarily return a message "There are . . . data. Please narrow down.", for example, before returning information. The optimum information preparation part 213 reads the message from the information base 203 on the basis of the instruction and returns the same to the first station 201 through the information transmission part 214. The retrieval engine 292 makes retrieval again depending on the contents of a subsequent answer from the user.

The depth and width of the hierarchy subjected to retrieval may be determined in response to the contents required by the user. When information related to "castle" is required, for example, the optimum information reparation part 213 is instructed not to return all information related to "castle" but to temporarily return only information on "Osaka-Jo" as representative information. Not a few users are satisfied with this. An initial retrieval range is preferably simultaneously set in creation of data (data stored as sub-storage/hierarchical storage information 239) defining hierarchical structure/relevant information to be stored as part of the sub-storage/hierarchical storage information 239 along with data related to the hierarchical structure and the like.

As described with reference to "Outline of Fourth Embodiment", the information base 203 can be utilized as a dispersive•network information base including the information bases 203a and 203b or the information base 203c of the other terminal 205 (generally plural) connected to the network. Therefore, the retrieval engine 292 can utilize the whole of the information bases 203a, 203b and 203c equivalently to the information base 203b. At this time, a hierarchical structure can be set for the plurality of information bases 203a, 203b and 203c for determining how deep and wide to make retrieval on the hierarchy with reference to the cost, the speed and the like. Data defining the hierarchical structure of the information bases 203a to 203c is preferably also previously stored as part of the sub-storage/hierarchical storage information 239.

Ambiguous Retrieval Part (1)

In relation to information in the form of an image or a voice, the object to be retrieved may not be univocally decided with only the optimum example but determination may be difficult. When registering information in the form of an image, a voice or the like in the information base 203b in such case, sensuous retrieval is enabled by assigning ambiguous parameters (e.g., hard-soft, warm-cool etc.) as indices. The ambiguous retrieval part 293 efficiently performs retrieval based on a concept incapable of univocally setting correspondence/non-correspondence, i.e., retrieval closer to human determination by employing such ambiguous parameters as clues.

In place of providing any of "hot-warm-cold" to each information as an ambiguous parameter, the concept may be quantized to assign "warmness=4" or the like to each information. For example, it is possible to assign any of "softness=1 to 10" to each information related to "eyeglasses", and to assign any of "imposing appearance=1 to 10" to each information related to "castle". It is also possible to assign a plurality of types of ambiguous parameters (e.g., "warmness=3" and "softness=5") to single information.

These ambiguous parameters are preferably added to the information when registering information such as images and voices in the information base 203b. The ambiguous parameters can be automatically assigned through the image recognition part 272 or manually assigned by the operator. When information provision requirement for "somewhat soft eyeglasses", "a grand castle" or the like is received, the ambiguous retrieval part 293 retrieves information to which a parameter corresponding thereto is assigned.

Ambiguous Retrieval Part (2)

In the example that the user's demand (contents of requirement" is "the user requires information related to eyeglasses suiting his face for re-purchasing" as already described, the image recognition part 272 analyses the image of the user's face and extracts the features thereof. The extracted data (the contour of the face such as a round or narrow face, the color of the skin, the depth of clear-cutness and the like, for example) are transmitted to the response part 290 along with the requirement list 278. Further, personal data related to the user's age, gender etc. extracted from the user information 234 are also transmitted to the response part 290.

On the basis of these data, the ambiguous retrieval part 293 retrieves features (shape, color, material, size etc.) of eyeglasses suitable to the features of the user's face and those such as the user's age, gender and the like from contents (any of A to F in FIG. 13) stored in the information base 203b. At this time, data defining the relation between the features of the user's face and the features of the eyeglasses suiting each other and data defining the relation between the features such as the user's age, gender etc. and the features of the eyeglasses are referred to. The data defining these relations are stored in relating information ($\alpha$ and $\beta$) in FIG. 13. The result of retrieval is transmitted to the optimum information preparation part 213 through the determination part 291.

The features are previously assigned as labels when information is registered in the information base 203b, for example. Alternatively, the features may be automatically extracted and assigned as labels on the basis of image information of eyeglasses when the second station 202 is free. At this time, the image recognition part 272 preferably extracts the features of image information of eyeglasses included in the information base 203b as the objects of processing. Thus, each processing provokes its functions in various scenes in this system.

Example Base Part

The example base part 294 refers to the information related to the past facts recorded in the information base 203b thereby retrieving information responsive to the user's demand (contents of requirement). For example, the example base part 294 selects eyeglasses on the basis of the user information 234 in consideration of the user's liking or retrieves a product (e.g., eyeglasses) on the basis of market information ". . . is most salable for women in thirties". In consideration of the results of retrieval by the ambiguous retrieval part 293 and the example base part 294, the determination part 291 transmits a result of retrieval for selecting only information (logical product) simultaneously received from both as optimum information responsive to the user's requirement to the optimum information preparation part 213. Past information (e.g., access record) is regularly added in response to occurrence of a new example (e.g., access).

The determination part 291 also performs processing of selecting partial information from a plurality of information. When determining that the number of information is excessive, for example, the determination part 291 selects some in sequence most suitable to the demand and transmits which ones are selected to the optimum information preparation part 213.

Optimum Information Preparation Part

Figure 14:
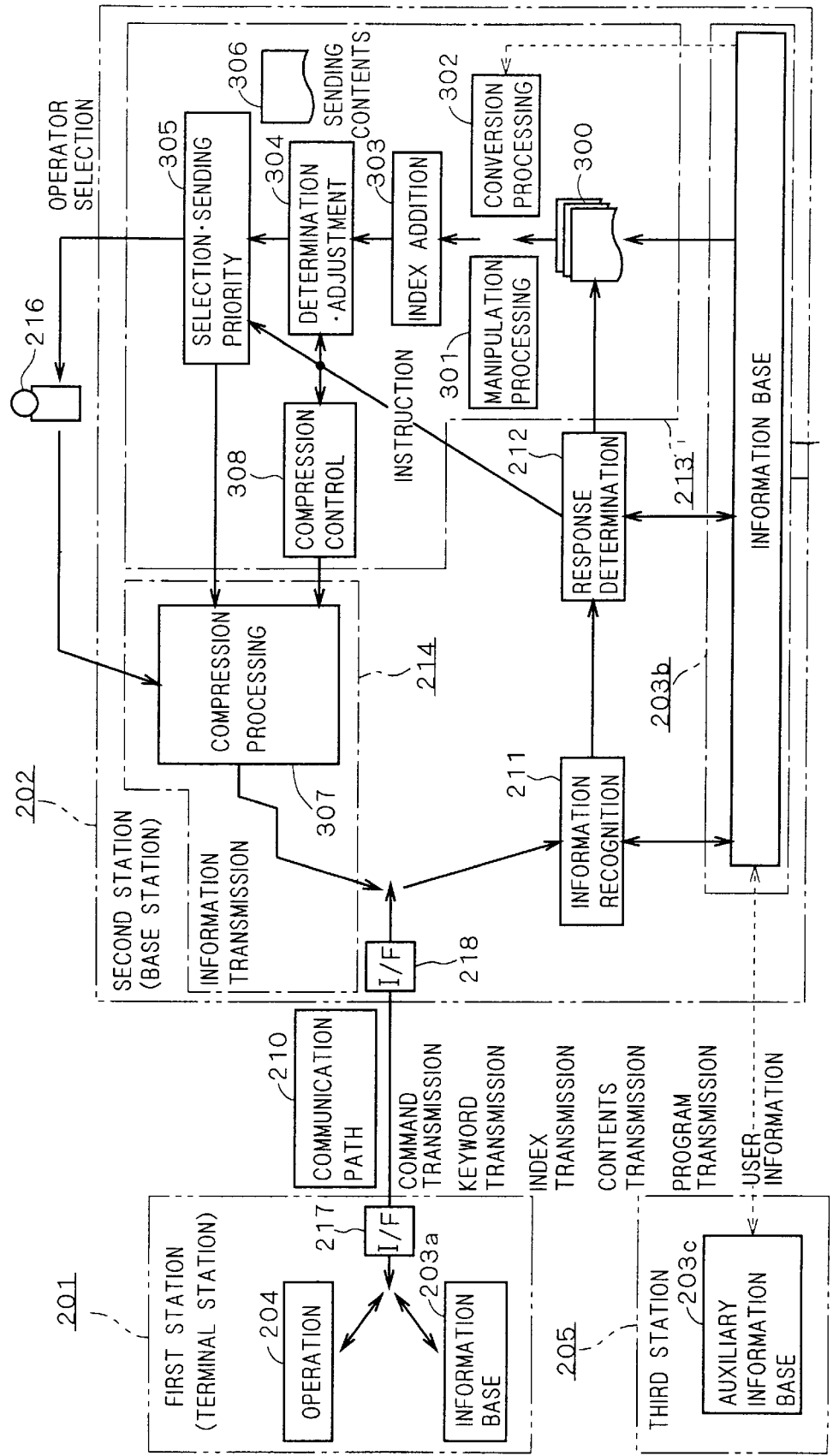
FIG. 14 is a block diagram of an optimum information preparation part in the fourth embodiment of the present invention.

A preferred mode of the optimum information preparation part 213 is now described with reference to FIG. 14.

As already described, the optimum information preparation part 213 prepares information optimum for the user on the basis of the instruction (result of retrieval etc.) from the response determination part 212 with the information in the information base 203. The optimum information preparation part 213 preferably comprises a manipulation processing part 301, a conversion processing part 302, an index addition part 303, a determination•adjustment part 304, a selection•sending priority part 305 and a compression control part 308. On the basis of the instruction (result of retrieval etc.) from the response determination part 212, the optimum information preparation part 213 reads selected contents 300 which are selected information from the information base 203.

Selection•Sending Priority Part

The selection•sending priority part 305 can select one or a plurality of information most suitable to the user's demand from the selected contents 300 and transmit the same to the information transmission part 214. When optimum information cannot be selected, it is also possible to present a plurality of choices to the user for making re-selection. Alternatively, it is also possible to present a question related to deficient information to the user and newly return optimum information on the basis of his answer. In other words, it is possible to perform part of the processing performed in the retrieval engine 292 in the selection•sending priority part 305.

The selection•sending priority part 305 can also select an operation of the operator 216. When no information matching with the demand is obtained, an automatic response by any unit of the second station 202 is unavailable for some reason or the user's demand is "conversation with the operator", for example, the selection•sending priority part 305 selects a response by the operator 216. When the response by the operator 216 is selected, processing such as information retrieval can be performed on the basis of an operation of the operator 216. Further, the image and the voice of the operator 216 are transmitted to the user. In other words, the user can talk with the operator 216 in the form of visual telephones.

The selection•sending priority part 305 can also perform sequencing in relation to information to be sent on the basis of the information quantity in consideration of the memory capacity of the first station 201, and can also perform sequencing based on the information cost in consideration of the connection charge for the communication path 210 and presence/absence of copyright for the information. Sequencing is so performed as not to send costly information. For example, priority is established for information to be sent in sequence of text>still picture>motion picture>operator. When information on "Osaka-Jo" is required, processing of returning only the characters "Osaka-Jo" for the time being and then returning image information such as a picture if receiving further requirement for image information is performed.

The response determination part 212 may extract information related to the user's profession, past history and the like with reference to the user information 234 or the like and transmit an instruction responsive thereto to the selection•sending priority part 305. The selection•sending priority part 305 changes the priority of the information to be sent in response to this instruction. Thus, when the user is an architect or such past records or custom that he regularly requires not only the characters "castle" but also an image is recognized, for example, processing of transmitting the image from the first is performed. Alternatively, an instruction may be made on the basis of the user's requirement.

Manipulation•Conversion Processing Part

"Preparation of optimum information" by the optimum information preparation part 213 includes not only processing of simply selecting necessary information from the information base 203 but also processing of manipulating•converting information when optimum information is not found in the information base 203. The manipulation processing part 301 and the conversion processing part 302 perform manipulation and conversion of information respectively.

When information on a small red car is required and only information on a small white car is obtained as a result of retrieval by the response determination part 212, for example, the manipulation part 301 provides information while painting the car red. Since it is possible to order a red car to a car maker, it can be said that it is a rather kind response to the user to automatically supplement deficient information.

When the user is a Japanese and information sent from the response determination part 212 includes English information, for example, the conversion processing part 302 automatically translates this information to Japanese.

Determination•Adjustment Part (1)

In relation to image information, the determination•adjustment part 304 optimizes compressibility and a frame number (screen number per unit time). In a transmission system for a pseudo motion picture by a continuous still picture such as "motion JPEG", for example, it is possible to continuously change compressibility defining the quality of one screen and a frame number defining the transmission speed on the screen. Therefore, it is possible to properly set the data quantity of an image to be transmitted by adjusting the aforementioned two parameters in response to the transmission capacity or the busy condition of the communication path 210.

When there are two parameters to be optimized, it is possible to fix one and decide the other in general. Depending on the character of the information (contents), processing of giving priority to either parameter can be performed. When transmitting a motion picture of a landscape, for example, processing of assigning the highest priority to the picture quality of one screen (reducing the compressibility) while reducing the frame number is proper. When transmitting a motion picture of a sport scene or a moving object, on the other hand, processing of assigning priority to the frame number (setting the frame number large) and reducing the picture quality of one screen (increasing the compressibility) is proper.

In other words, the picture quality and the frame number of one screen are automatically adjusted in response to the character of the image information such as a landscape, sport or a moving object. Whether the image information is a motion picture or a still picture can be determined by obtaining the difference between a preceding image (image preceding by one screen) and a current image (image on the current screen). Thus, processing of assigning priority to the picture quality of one screen when a person is still and then assigning priority to the frame number after the still person starts to move, for example, can be automatically performed. The character related to the contents of the image information such as a landscape or sport can be determined on the basis of an index assigned to the image information. The determination•adjustment part 304 automatically executes such processing.

When the user instructs that he regards the picture quality as more important than the cost, the response determination part 212 transmits an instruction responsive thereto to the determination•adjustment part 304. At this time, the determination•adjustment part 304 sets both the frame number and the picture quality of one screen high while ignoring the cost.

Determination•Adjustment Part (2)

In order to reuse motion picture information recorded in the information base 203a of the first station 201 for broadcasting or another object, it may be proper to set its data length (total quantity of signals) in a certain time width. For example, only information of five minutes long may be required. For this purpose, the determination•adjustment part 304 preferentially performs culling from a part having no change in relation to image information of a motion picture to be transmitted. In other words, a motionless screen such as a part expressing only the landscape of Mount Fuji is preferentially culled among screens forming the motion picture.

Voice information accompanying (i.e., to be simultaneously reproduced with) the image information is also culled at the same time. At this time, silent parts are preferentially culled. However, there may be such a case that culling must be performed in a voice state. If culling is simply performed in this case, the voice frequency (pitch) changes. Pitch conversion is performed in order to prevent this. For example, frequency conversion through a well-known pitch filter is employed along with a formant filter formed by two variable frequency secondary filters (implemented in a state variable type or the like). Thus, unnaturalness of the pitch and the formant is simultaneously eliminated.

In place of automatically performing culling in the aforementioned manner, the determination•adjustment part 304 may perform culling in response to an instruction from the response determination part 212 based on the user's requirement.

Index Addition Part

The index addition part 303 adds indices to the information (contents) to be sent to the first station 201. When the second station 202 is a broadcasting station sending TV programs, for example, the index addition part 303 adds names to the TV programs as indices. When the second station 202 is a cable base station regularly sending only music, for example, the index addition part 303 adds information such as names of music pieces to the music contents as indices.

Thus, the receiving end (first station 201) can receive the sent contents and employ the information base 203a as a storage node medium for recording the contents.

When there are contents such as broadcasted TV programs, for example, the information base 203a can be utilized as a program recorder. When reserving recording of any program, recording can be automatically started on the basis of indices added to the contents of the program through the information selection part 321.

Indices such as the title or a place name of a news program and the names of singers in a song program can also be added to the contents of TV programs in addition to the names of the programs. Thus, the first station 201 can simultaneously monitor indices of TV programs as continuously sent streaming contents over a plurality of channels by previously setting the names of specific singers, the title of a specific news program, a place name and the like for starting recording a program when a specific index for the program is detected.

Not only names of music pieces but also categories, modes of songs (e.g., duet, solo and chorus) can be added to the music contents as indices. Thus, the user can selectively store only duets, for example, in the information base 203a.

Compression Control Part

The information transmission part 214 is provided with a compression processing part 307 compressing signals expressing information to be sent. The compression control part 308 controls this compression processing part 307. When the quantity of transmittable data is limited due to system restriction of the communication path 210 or the first station 201, the compression control part 308 controls the compression processing part 307 to compress image information having a large data quantity, for example, with large compressibility. The compression processing part 307 has variable compressibility, and the compression control part 308 automatically decides the best compressibility toward a data quantity within a target range in response to the data quantity of the information to be transmitted. The target data quantity is set with reference to the memory capacity and the throughput of the first station 201 and the transmission capacity and the degree of congestion of the communication path 210, for example.

The response determination part 212 may extract information related to the user's occupation and past history with reference to the user information 234 and transmit an instruction responsive thereto to the compression control part 308. In response to this instruction, the compression control part 308 changes the compressibility for the information to be sent. Thus, when the user is a doctor or past records or custom of regularly requiring precise images related to medical treatment is recognized, for example, processing of transmitting medical images with low compressibility is performed. Alternatively, an instruction may be made on the basis of the user's requirement.

Information Transmission Part

Figure 15:
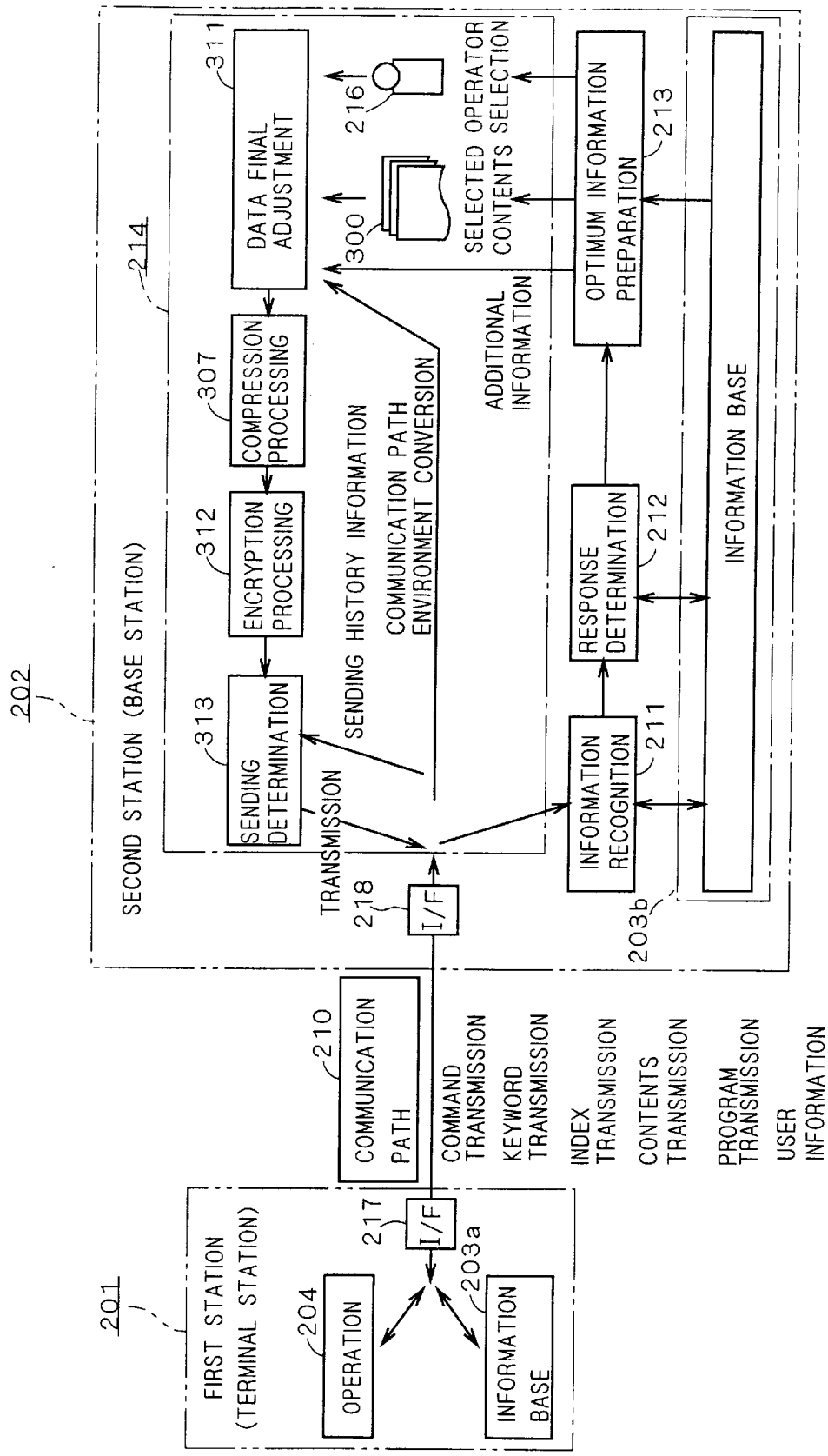
FIG. 15 is a block diagram of an information transmission part in the fourth embodiment of the present invention.
Figure 16:
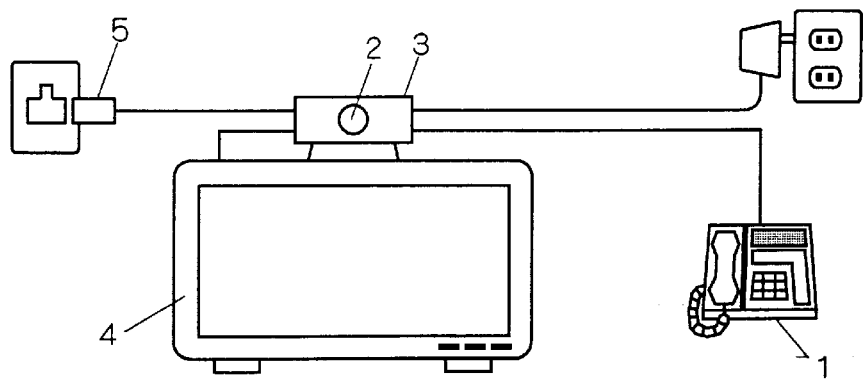
FIG. 16 schematically illustrates a branch station in a conventional electronic talking system.

With reference to FIG. 15, a preferred mode of the information transmission part 214 is now described.

In processing of transmitting the contents prepared in the optimum information preparation part 213 to the first station 201, it is generally desirable to provide optimum information transmission means responsive to information forms such as images (still picture-motion picture), voices, character texts and data, and it is possible to ensure economy and generality by employing the same. For example, it is possible to compress the signal expressing the information by compression or reduce the data quantity by reducing a sampling rate or by trimming, thereby improving economy. When transmitting information in a mixed state of a plurality of information forms (images, voices and data, for example), it is desirable to employ a communication protocol suitable to the mixed state. Thus, generality is improved.

When transmitting a digital signal, a compression technique based on an information theory can be utilized. When Huffman coding is employed, the total data quantity is compressed by allocating short codes to frequently appearing data (characters or words in a text or a data string in an image or a voice, for example) and allocating long codes to data having a low appearance ratio. In addition to such a technique, various compression modes suitable to the respective information forms are known. For example, JPEG is known for still pictures, MPEG4 is known for motion pictures, and ADPCM and MP3 are known for voices. As to the protocol for collectively transmitting the compression information, H.324 internationally standardized for visual telephones or the like is set, for example.

The information transmission part 214 ensures economy and generality in information transmission through such known techniques. For this purpose, the information transmission part 214 comprises a data final adjustment part 311, the compression processing part 307, an encryption processing part 312 and a sending determination part 313.

Data Final Adjustment Part (1)

On the bidirectional communication path 210 whose transmission rate fluctuates, there is no guarantee that information including already compressed images is smoothly transmitted. The bit rate of transmittable information fluctuates depending on the situation (e.g., the user transmits a large quantity of information in bidirectional communication or the second station 202 utilizes the single communication path 210 in a multiplex manner by time sharing, for example), for example. Therefore, the data final adjustment part 311 establishes priority for information to be transmitted in response to the information forms (images, voices, characters etc.) and sequentially transmits the information to the communication path 210 from that having higher priority. It is possible to adjust the compressibility in the compression processing part 307 and match the total data length with a prescribed magnitude by assigning the lowest priority to images, for example.

Data Final Adjustment Part (2)

It may be desirable to assign a constant information quantity (data quantity) to each of the plurality of first stations 201 simultaneously connected to the second station 202 by multiplexing, i.e., to fix the transmission rate to a constant level. Thus, increase of cost management can be suppressed. When fixing the compressibility in image compression employing the aforementioned Huffman coding, the quantities of data are different between complicated images and simple images, for example. The data final adjustment part 311 detects the size of the images after compression by the compression processing part 306 to increase the compressibility for complicated images and reduce that for simple images thereby holding the transmission rate within a constant target range on the given communication path 210.

Data Final Adjustment Part (3)

The data final adjustment part 311 can also establish priority for information to be transmitted in response to the user's demand on the basis of the importance thereof. Adjustment of bidirectional communication is performed on the basis of priority suitable for the importance of information: answer by the operator>return of contents selected by the operator>transmission of the contents of the user's requirement>automatic return of the contents (the left side of each sign of inequality has higher priority than the right side), for example.

Alternatively, it is also possible to give priority to transmission allocation to a talker or to send data related to "rates of operation" of both compression functions to opposite ends for controlling the compressibility in compression processing on the basis of the received data of "rates of operation". When one end performing bidirectional communication is busy, the other end can suspend processing.

Sending Determination Part

It can be said that sending of information once sent in the past is wasteful in communication. Therefore, the sending determination part 313 determines whether or not information to be sent on the basis of the user's demand has already been sent in the past on the basis of sending history information, not to re-send the information but to return only information "previously sent", for example, if the information has already been transmitted. While the user may forget that he has already required the information in the past and require the same information again, wasteful information provision can be avoided through the sending determination part 313. Thus, the communication efficiency can be improved for reducing an unnecessary economical burden on the user.

The user information 234 stored in the information base 203b may be referred to as the sending history information. At this time, the user information 234 is transmitted to the sending determination part 313 through the response determination part 212, for example. Further, it is also possible to access the information base 203a provided on the user's first station 201 thereby referring to the user information 222 recorded therein as the sending history information. Thus, it is possible to reduce a burden of storing user information 234 related to a number of users in the information base 203b of the second station 202.

When the information to be sent on the basis of the user's demand partially includes previously sent information, the sending determination part 313 can send only information (difference information) corresponding to the difference between the information and the previously sent information.

Encryption Processing Part

In bidirectional image/voice communication through the Internet or the like, it is important to ensure privacy and security. For this purpose, encryption is generally employed. As means of encryption, a method having an encryption key and employing conversion with a function is simply known. Further, a method such as SSL is generally employed for electronic mails or the like. However, encryption results in loads on the quantity of calculation, the processing speed etc. in both terminals making communication with each other, as a matter of course.

The encryption processing part 312 changes the level of encryption in response to the counterpart of communication, the contents of communication and the form (voice, image, text or the like) of the information to be transmitted. For example, it is possible to automatically or manually select the level of encryption including whether or not to perform encryption for performing no encryption in the case of general image data allowing interception while performing encryption for private information of a connector.

In order to automatically select the encryption level, a security level is preferably assigned to each of the contents (selected contents) transmitted from the optimum information preparation part 213. The security level can be manually assigned when input in the database, for example. The encryption processing part 312 automatically sets the encryption level in response to the security level. When there is requirement such as "desire secrecy" as the user's demand, this requirement is transmitted to the encryption processing part 312 through the response determination part 212. The encryption processing part 312 performs encryption in response to this.

The compression control part 308 can also allocate different encryption keys to the respective information forms, and can further allocate different encryption keys to dispersed information bases (e.g., the information bases 203a, 203b and 203c). Thus, security of communication can be further improved.

While the invention has been shown and described in detail, the foregoing description is in all aspects illustrative and not restrictive. It is therefore understood that numerous modifications and variations can be devised without departing from the scope of the invention.

What is claimed is:

1. An information communication system for making information interchange between a plurality of first stations having communication functions and a prescribed second station having a communication function through a communication path, having an information base including various types of information arranged on at least one of said second station, said first stations and a third station other than said first and second stations, wherein said second station comprises:
an information recognition part recognizing the semantic contents of information transmitted from each said first station on the basis of information in said information base,
a response determination part determining the optimum response on the basis of the result of said recognition,
an optimum information preparation part preparing transmission information with information in said information base on the basis of said determination and transmitting said transmission information to each said first station,
wherein said second station further comprises an information transmission part interposed between said optimum information preparation part and said communication path for processing information output from said optimum information preparation part, and
said optimum information preparation part comprises a compression control part controlling compressibility in a compression processing part so that a signal quantity of information transmitted to said communication path is within a target range.

2. The information communication system according to claim 1, wherein
said second station has a second station information base as at least part of said information base, and
said second station information base stores information along with an index accompanying said information.

3. The information communication system according to claim 2, wherein
a hierarchical structure is defined for said index to express a conceptual hierarchical structure of said information.

4. The information communication system according to claim 3, wherein
said response determination part retrieves, when any said first station requires provision of information and said required information is absent, information closest to said required information on the basis of said hierarchical index.

5. The information communication system according to claim 3, wherein
said response determination part limits the depth and width of retrieval when retrieving information on the basis of said index for which said hierarchical structure is defined.

6. The information communication system according to claim 2, wherein
said index includes an ambiguous parameter for which correspondence or non-correspondence is not univocally ascertained, and
said response determination part comprises an ambiguous retrieval part retrieving information on the basis of said ambiguous parameter when requirement for provision of information is received from any said first station while determining whether or not said ambiguous parameter corresponds to said requirement.

7. The information communication system according to claim 1, wherein
said second station has a second station information base as at least part of said information base, and
said second station information base stores user information related to each said first station.

8. The information communication system according to claim 1, wherein
said second station has a second station information base as at least part of said information base, and
said second station information base stores data defining relation between a plurality of information as sub-storage/hierarchical storage information.

9. The information communication system according to claim 8, wherein
said response determination part retrieves, when any said first station requires provision of information and said required information is absent, related information on the basis of said hierarchical index.

10. The information communication system according to claim 1, wherein
each said first station comprises:
a user interface having a communication medium mediating transfer of information between said first station and an operator of said first station, and
an input/output optimization part adjusting the signal quantity of information to be transmitted in response to the form of said information mediated by said user interface and the state of said communication path.

11. The information communication system according to claim 1, wherein
each said first station comprises:
a priority processing part assigning priority to information to be transmitted and preferentially transmitting information having higher priority to said communication path.

12. The information communication system according to claim 1, wherein
each said first station comprises:
a user interface having a communication medium mediating transfer of information between said first station and an operator of said first station, and
an operation system optimization part setting a plurality of selectable operation modes for said user interface on the basis of operation of said operator of said first station.

13. The information communication system according to claim 1, wherein
each said first station comprises:
a user interface having a plurality of communication media mediating transfer of information between said first station and an operator of said first station, and
a conversion processing part selectively turning off said plurality of communication media.

14. The information communication system according to claim 13, wherein
said conversion processing part further transmits another information in place of information to be essentially transmitted by any of said communication media selectively turned off.

15. The information communication system according to claim 1, wherein
each said first station comprises:
a first station information base as at least part of said information base, and
an information selection part selecting information including previously set specific information from a plurality of information transmitted by said second station and recording said information in said first station information base.

16. The information communication system according to claim 1, wherein each said first station comprises a communication interface connected to an end of said communication path, and said communication interface comprises a protocol conversion part superposing information of another form on a blank area of a protocol of visual telephone communication and transmitting said information to said communication path and separating said information of another form superposed on said protocol received through said communication path.

17. The information communication system according to claim 1, wherein said second station comprises a communication interface connected to an end of said communication path, and said communication interface comprises a protocol conversion part superposing information of another form on a blank area of a protocol of visual telephone communication and transmitting said information to said communication path and separating said information of another form superposed on said protocol received through said communication path.

18. The information communication system according to claim 1, wherein each said first station comprises a communication interface connected to an end of said communication path, and said communication interface comprises a composite error correction part detecting an error included in information received through said communication path and selectively executing any of error correction, requirement for retransmission of information, no error correction and manipulation on said received information in response to the form of said received information.

19. The information communication system according to claim 1, wherein said second station comprises a communication interface connected to an end of said communication path, and said communication interface comprises a composite error correction part detecting an error included in information received through said communication path and selectively executing any of error correction, requirement for retransmission of information, no error correction and manipulation on said received information in response to the form of said received information.

20. The information communication system according to claim 1, wherein said information recognition part comprises:
    a plurality of recognition parts extracting features from a plurality of forms of information,
    a data classification part distributing information received through said communication path to said plurality of recognition parts in response to the form thereof, and
    a demand recognition part recognizing the contents of requirement from each said first station on the basis of features extracted by at least one of said plurality of recognition parts.

21. The information communication system according to claim 20, wherein said information base stores information related to said first stations, and at least one of said plurality of recognition parts extracts features with reference to said information related to said first stations.

22. The information communication system according to claim 20, wherein said information recognition part further comprises:
    an evaluation function part making authentication as to whether or not an operator of each said first station is the right person on the basis of said features extracted by at least one of said plurality of recognition parts.

23. The information communication system according to claim 20, wherein said demand recognition part refers to said information base in addition to recognition of the contents of requirement from said first station thereby inferring further detailed contents of requirement.

24. The information communication system according to claim 20, wherein at least one of said plurality of recognition parts extracts features by utilizing arithmetic processing by said third station.

25. The information communication system according to claim 20, wherein at least one of said plurality of recognition parts extracts physical features of an operator of each said first station, and said response determination part comprises an ambiguous retrieval part retrieving information from said information base in consideration of extracted said physical features.

26. The information communication system according to claim 1, wherein said information base stores information related to past facts, and said response determination part comprises an example base part retrieving, when requirement for provision of information is received from any said first station, information responsive to said requirement from said information base with reference to said information related to past facts.

27. The information communication system according to claim 1, wherein said optimum information preparation part comprises:
    a selection•sending priority part selecting, when receiving requirement for provision of information from any said first station, only partial information suitable to said requirement from information retrieved in said response determination part and transmitting said partial information to said communication path.

28. The information communication system according to claim 1, wherein said optimum information preparation part comprises:
    a selection•sending priority part selecting response by an operator of said second station when receiving requirement from any said first station or said second station cannot automatically respond.

29. The information communication system according to claim 1, wherein said optimum information preparation part comprises a selection•sending priority part preferentially transmitting information having a smaller information quantity to said communication path among information to be transmitted to said communication path.

30. The information communication system according to claim 1, wherein said optimum information preparation part comprises:
    a manipulation processing part changing, when information read from said information base on the basis of the result of retrieval by said response determination part includes a part mismatching with requirement from any said first station, said mismatching part to match with said requirement.

31. The information communication system according to claim 1, wherein said optimum information preparation part comprises:
a conversion processing part translating information read from said information base on the basis of the result of retrieval by said response determination part into a language suitable for an operator of any said first station.

32. The information communication system according to claim 1, wherein said second station further comprises a compression processing part compressing information transmitted from said optimum information preparation part to said communication path, and said optimum information preparation part comprises:
a determination•adjustment part adjusting, when information read from said information base includes image information, a frame number and compressibility in said compression processing part for said image information.

33. The information communication system according to claim 32, wherein said determination•adjustment part adjusts said frame number and said compressibility in response to the character of said image information.

34. The information communication system according to claim 1, wherein said optimum information preparation part comprises:
a determination•adjustment part preferentially culling an image of a screen having no motion with respect to motion information to be transmitted to said communication path so that a reproduction time for said motion information and voice information accompanying said motion information is within a target range, preferentially culling a silent part with respect to said voice information, and further performing pitch conversion when a non-silent part must be culled.

35. The information communication system according to claim 34, wherein each said first information comprises:
a first station information base as at least part of said information base, and
an information selection part selecting information to which a previously set specific index is added from a plurality of information transmitted by said second station and recording said information in said first station information base.

36. The information communication system according to claim 1, wherein said optimum information preparation part comprises:
an index addition part adding an index to information transmitted to said communication path.

37. The information communication system according to claim 1, wherein said second station further comprises an information transmission part interposed between said optimum information preparation part and said communication path for processing information output from said optimum information preparation part, and said information transmission part comprises a data final adjustment part establishing priority among said output information in response to the form of said information and transmitting said information to said communication path sequentially from information having higher priority to said communication path.

38. The information communication system according to claim 1, wherein said second station further comprises an information transmission part interposed between said optimum information preparation part and said communication path for processing information output from said optimum information preparation part, and said information transmission part comprises:
a compression processing part compressing said output information, and
a data final adjustment part controlling compressibility in said compression processing part so that the signal quantity of information transmitted to said communication path is within a target range.

39. The information communication system according to claim 1, wherein said second station further comprises an information transmission part interposed between said optimum information preparation part and said communication path for processing information output from said optimum information preparation part, and said information transmission part comprises:
a data final adjustment part establishing priority for said output information on the basis of importance thereof and preferentially transmitting information having higher priority to said communication path.

40. The information communication system according to claim 1, wherein said information base stores sending history information being data related to information sent in the past,
said second station further comprises an information transmission part interposed between said optimum information preparation part and said communication path for processing information output from said optimum information preparation part, and
said information transmission part comprises:
a sending determination part deleting information having history transmitted to any said first station in the past from said output information on the basis of said sending history information and transmitting said information to said communication path.

41. The information communication system according to claim 1, wherein said second station further comprises an information transmission part interposed between said optimum information preparation part and said communication path for processing information output from said optimum information preparation part, and said information transmission part comprises:
an encryption processing part performing encryption selected from a plurality of encryption methods on said output information.

42. An information communication system for making information interchange between a plurality of first stations having communication functions and a second station having a communication function through a communication path, having an information base including various types of information arranged on at least one of said second station, said first stations, and a third station other than said first and second stations, wherein said second station comprises:

means for recognizing semantic contents of information transmitted from each of said first stations on the basis of information in said information base;

means for determining an optimum response on the basis of results from said means for recognizing;

means for preparing transmission information with information in said information base on the basis of results from said means for determining an optimum response and for transmitting said transmission information to each of said first stations, wherein said means for preparing further comprises means for controlling compressibility in a compression processing part so that a signal quantity of information transmitted to said communication path is within a target range;

means for processing information output from said means for preparing; and means for transmitting interposed between said means for preparing and said communication path.

43. An information communication system for making telephone calls between a plurality of electronic talking terminals and a host base station, wherein said host base station at least comprises:

a host microphone apparatus inputting the voice of an operator in said host base station;

a display displaying an image as to prescribed information; and a host control part transmitting/receiving a signal related to at least the voice of said operator to/from each said electronic talking terminal, each said electronic talking terminal at least comprises:
  a branch microphone apparatus inputting the voice of each terminal user; and
  a branch control part connected to a prescribed terminal of a television set receiving public television broadcasting for transmitting/receiving a signal related to at least a voice to/from said host base station, said host control part has:
  a function connected to the Internet for capturing Web information in the Internet and displaying said Web information on at least a part of said display,
  a function of transmitting downloaded said Web information to each said electronic talking terminal along with said signal related to the voice of said operator input at least through said host microphone apparatus, and
  a function of outputting the voice of said each terminal user through a prescribed speaker on the basis of a signal related to at least the voice of said each terminal user transmitted from each said electronic talking terminal, and said branch control part has:
  a function of transmitting at least said signal related to the voice of said each terminal user input in said branch microphone apparatus to said host base station,
  a function of outputting the voice of said operator through said television set on the basis of said signal related to the voice of said operator received from said host base station, and
  a function of displaying said Web information received from said host base station on said television set.

44. The information communication system according to claim 43, wherein said host base station further comprises a host television camera acquiring an image of said operator in said host base station, said host control part further comprises a function of transmitting a signal related to said image of said operator acquired by said host television camera to each said electronic talking terminal along with said Web information and said signal related to the voice of said operator input through said host microphone apparatus, and said branch control part further comprises a function of displaying an image transmitted from each said electronic talking terminal on another part of said display simultaneously with said Web information.

45. The information communication system according to claim 44, wherein each said electronic talking terminal further comprises a branch television camera acquiring an image of said terminal user, said branch control part further comprises a function of transmitting a signal related to said image of said terminal user acquired by said branch television camera to said host base station along with said signal related to the voice of said terminal user input through said branch microphone apparatus, and said host control part further comprises a function of displaying said image of said terminal user transmitted from each said electronic talking terminal on another part of said display simultaneously with said Web information.

46. The information communication system according to claim 43, wherein each said electronic talking terminal further comprises a branch input unit for specifying a hyperlink introduced into said Web information and inserted in linkage to require Web information of another address or for specifying the address of said Web information requiring receiving on said branch control part, said branch control part further has a function of requiring information of said hyperlink or said address specified by said branch input unit to said host base station by transmission, and said host control part further comprises a function of downloading Web information related to said hyperlink or said address from said Internet when said information of said hyperlink or said address is transmitted from said branch control part and distributing said Web information to said branch control part.

* * * * *